(12) United States Patent
Parra Michel et al.

(10) Patent No.: US 11,128,413 B2
(45) Date of Patent: Sep. 21, 2021

(54) GENERIC OF DOUBLY SELECTIVE CHANNEL EMULATOR, LOCALLY NON-STATIONARY IN TIME, NONSTATIONARY IN FREQUENCY, WITH NON-SEPARABLE DISPERSION FUNCTION

(71) Applicant: CINVESTAV-IPN ( Centro de Investigación . . ., Mexico City (MX)

(72) Inventors: Ramón Parra Michel, Jalisco (MX); Luis René Vela García, Jalisco (MX)

(73) Assignee: Centro de Investigación y de Estudios Avanzados del Instituto Politécnico Nacional

( * ) Notice: Subject to any disclaimer, the term of this patent is extended or adjusted under 35 U.S.C. 154(b) by 0 days.

(21) Appl. No.: 16/226,440

(22) Filed: Dec. 19, 2018

(65) Prior Publication Data
US 2019/0268112 A1 Aug. 29, 2019

(30) Foreign Application Priority Data
Dec. 20, 2017 (MX) .................... MX/a/2017/016953

(51) Int. Cl.
*H04L 5/00* (2006.01)
*H04L 27/00* (2006.01)

(52) U.S. Cl.
CPC ........ *H04L 5/0008* (2013.01); *H04L 27/0004* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,485,600 A | * | 1/1996 | Joseph | G06F 8/34 703/13 |
| 9,563,599 B2 | * | 2/2017 | Follett | G06F 15/82 |
| 10,129,862 B1 | * | 11/2018 | Wu | H04B 17/318 |
| 10,142,844 B2 | * | 11/2018 | Xu | H04W 12/08 |
| 2003/0227410 A1 | * | 12/2003 | Ferreol | G06K 9/0057 342/420 |

(Continued)

*Primary Examiner* — Syed Ali
(74) *Attorney, Agent, or Firm* — IP Law Leaders PLLC; Andrew Aitken

(57) ABSTRACT

Currently, wideband channel simulation/emulation is carried out through channel realizations obtained from dispersion functions dictated by communication standards, in order to perform the tests and validation of the new data communication schemes. However, the channel models available in the state of the art only consider the simulation/emulation of stationary channels with separable dispersion characteristics, allowing only the treatment of unrealistic channels. The present invention describes and details a method and apparatus for performing the channel simulation/emulation in scenarios where the channel is doubly selective, i.e., selective in time and frequency, where the simulation/emulation is of an arbitrarily long duration, and for a channel that is locally non-stationary in time, not stationary in frequency and with a non-separable dispersion function. To solve this, the orthogonalization technique of the channel is used in conjunction with a windowing scheme in order to generate arbitrarily long realizations of doubly dispersive channels.

4 Claims, 17 Drawing Sheets

(56) References Cited

U.S. PATENT DOCUMENTS

| | | | |
|---|---|---|---|
| 2008/0080604 A1* | 4/2008 | Hur | H04L 27/0004 375/224 |
| 2008/0215300 A1* | 9/2008 | Sarkkinen | H04B 17/3912 703/4 |
| 2010/0177836 A1* | 7/2010 | Ylitalo | H04B 17/3912 375/267 |
| 2014/0245086 A1* | 8/2014 | Zaytsev | H03M 13/015 714/703 |
| 2014/0348120 A1* | 11/2014 | Kant | H04L 1/1835 370/329 |
| 2016/0234050 A1* | 8/2016 | Nagalpur | H04L 25/0226 |
| 2016/0285572 A1* | 9/2016 | Manghal | H04B 17/345 |
| 2017/0149522 A1* | 5/2017 | Passerieux | H04B 11/00 |
| 2017/0168988 A1* | 6/2017 | Sud | G06F 17/14 |

* cited by examiner

Eigenvalues  Eigenfunctions

GENERIC OF DOUBLY SELECTIVE CHANNEL EMULATOR, LOCALLY NON-STATIONARY IN TIME, NONSTATIONARY IN FREQUENCY, WITH NON-SEPARABLE DISPERSION FUNCTION

"CROSS REFERENCE TO RELATED APPLICATONS

Applicants claim priority to Mexican Application No. MX/A/2017/016953 filed on Dec. 20, 2017."

FIELD OF THE INVENTION

The present invention is related to the field of telecommunications; specifically, to the implementation of doubly dispersive broadband channel simulators/emulators capable of reproducing the non-stationarity observed in a reduced time interval. Moreover, the development presented in the present invention considers that the propagation paths arriving at the receiver can be correlated. This development will make it possible to test systems or wireless communication devices more realistically.

The constant search for the improvement of protocols and data communication schemes, due to the growing and massive demand by users of voice, data and video services, creates the need to have devices capable of performing the evaluation and validation of the new communications systems in order to help its early release to the market. In data communication systems (wired and wireless), this responsibility falls on test and validation tools such as channel simulators/emulators, which seek to simulate/emulate the propagation conditions of a communication channel. In this context, the term "simulator" refers to an implementation in programming technology or software, while the term "emulator" refers to an implementation of the physical type or hardware.

The objective of channel simulators/emulators is to reproduce propagation environments with temporal, frequency, and/or spatial selectivity, demonstrating that they are capable of introducing distortions with a high level of accuracy and whose statistical behavior is determined by predefined functions employed to represent the communications channel. In other words, they generate additive noise and multiplicative noise, which are characterized by stochastic processes (channel realizations) with a certain correlation. However, the simulation/emulation of real channels must consider the reproduction of the highly changing behavior of the channel over time, i.e., the channel is non-stationary since the channel statistics change as the receiver or transmitter moves in time and distance, and along the propagation environment where the link between transmitters and receivers is being carried out. Therefore, for the new communication systems where there is very high mobility, such as vehicle-to-vehicle (V2V) schemes, 60 GHz systems or in the Terahertz band, 4G and 5G systems, etc., the channels simulators/emulators must be able to reproduce the non-stationarity existing locally within the transmitted symbols or frames, according to a certain communication standard. Likewise, channel simulators/emulators must consider that the trajectories by which the transmitted data travel to and reach the receiver can be correlated, so to assume de-correlation between the trajectories is no longer valid for real channels.

BACKGROUND OF THE INVENTION

In a wireless communications system, the signals traveling from the transmitter to the receiver experience diffraction, refraction and reflection, which in general cause the transmitted wave front to be dispersed on multiple wave fronts; as a consequence several signal replicas transmitted reach the receiver. Because the different replicas received, in general, traveled through different paths, the channels with this phenomenology are referred to as multipath. The signals that pass through different trajectories suffer in general from different distortions, so the received signal is a conglomerate of phenomena that can only be analyzed statistically.

With the aforementioned phenomenology, the multipath communications system can be characterized by the following equation:

$$y(t) = \sum_{n=0}^{N(t)} A_n(t) u(t - r_n(t)) \cos(w_c(t - r_n(t))), \quad (I)$$

where u(t) represents the transmitted signal, y(t) the received signal, N(t) is the number of the paths which is time variant, $A_n(t)$ is the gain of each path, and $r_n(t)$ represents the time variant delay of each trajectory.

Considering a simplification of the previous model for its adequate treatment, it is considered the assumption of maintaining constant or fixed the number of trajectories that arrive at the receiver, N. Also, the delay value $r_n(t)$ is assumed as constant $r_n$ due to the rate of change in the delay value is considerably small and therefore the value is almost constant with respect to the symbol or frame transmission rate according to the communication scheme. With the simplifications mentioned, the model of the received signal can be represented as:

$$y(t) = \sum_{n=0}^{N-1} A_n(t) - u(t - \gamma_n) \cos((w_c - v_n)t - \theta_n), \quad (II)$$

where $\tau_n$, $v_n$, y $\theta_n$ correspond to the delay, frequency change and phase change, respectively, of the carrier of the n-th path with respect to the waveform of the transmitted signal.

Assuming that a Dirac delta function is transmitted, the received signal represents the impulse response of the channel. In its well-known baseband representation, denoted as C(t; τ), the impulse response results in the following expression:

$$C(t; \tau) = \sum_{n=0}^{N-1} A_n(t) \delta(t - \tau_n) e^{-j v_n t} e^{-j \theta_n}. \quad (III)$$

The aforementioned parameters are dependent on the propagation conditions and are considered as random, so that C(t; τ) is a two-dimensional stochastic process, which requires its statistical description in order to fully characterize it. However, it is common to consider that the variations given by $A_n(t)$, are due to the fades suffered by the signals due to the loss of amplitude the waves experience when passing through the propagation medium, known as loss by propagation (path loss), and which is dependent on the distance between the transmitter and the receiver, and that its random fluctuation around the mean value depends on the obstacles that the waves face when were refracted and diffracted by large obstacles such as buildings, trees, etc.;

this results in changes in the received power in orders of 10 dB in resolution range of 100λ-20λ, denominated as large scale fading [REF1].

In addition, in ranges less than 20λ there is a fading associated with the constructive and destructive sum of the multipath components, denoted as small-scale fading, which can produce fading of the amplitude of the received signal and y(t) in the range of 40 dB (10 dB above and 30 dB below the average power of the signal) in ranges as small as λ/2. Therefore, it is feasible to separate these variations as $C(t; \tau) = A(t)\Sigma_{n=0}^{N-1}\delta(t-\tau_n)e^{-jv_n t}e^{-j\theta_n}$.

An example of fluctuations in y(t) is shown in FIG. 1, where it can be seen the fading of the signal at different ranges.

Now, considering that for a time interval $T_{local}$ (in ranges of 20λ to 40λ [REF3]) the channel can be assumed with a constant value for A(t), then the fluctuations of the channel will be due to the sum of the multipaths. Considering further that there are a large number of trajectories (in practice, greater than 7 for each identifiable delay) it is feasible to arrive at the following channel model in its baseband representation for small-scale fading:

$$c_{bb}(t;\tau) = \sum_{m=0}^{M-1} \mu_m(t)\delta(\tau - \tau_m), \quad \text{(IV)}$$

where M represents the number of significant delays, and $\mu_m(t)$ corresponds to a complex Gaussian stochastic process. This model was obtained considering that the sum of a sufficient number of sinusoids with random phase results in a Gaussian process [REF1]. In order to reproduce channel realizations that produce distortions similar to those produced by the real channel, it is necessary to have the correlation function of (IV) and to be able of producing two-dimensional stochastic processes with that precise computed correlation function; that is, it should be calculated:

$$R_{c_{bb}}(t,s;\tau,\xi) = E\{c_{bb}(t;\tau)c_{bb}^*)(s;\xi)\}, \quad \text{(V)}$$

where s y ξ are auxiliary variables of time and time-delay, respectively.

Currently, the state of the art of simulators and channel emulators seek to reproduce the statistics of the communications channel considering it as stationary at all times of simulation and with a decorrelated dispersion function [REF2]. In these conditions, (V) for the model expressed in (IV) it can be represented as:

$$R_{c_{bb}}(\Delta t;\tau)_{est} = \sum_{m=0}^{M-1} R_m(\Delta t)\delta(\tau - \tau_m), \quad \text{(VI)}$$

where Δt=t−s. Obtaining the Fourier transform of (VI) with respect to the variable Δt, it results in the channel's scattering function, S(v,τ), as follows:

$$S(v,\tau) = \sum_{m=0}^{M-1} S_m(v)\delta(\tau - \tau_m) \quad \text{(VII)}$$

where v is the frequency dispersion in the Doppler domain.

As well-known useful definitions, it can be named the Power Delay Profile (PDP), denoted as P(τ), which is the one-dimensional function obtained from integrating (VII) with respecto to the variable v; while S(v) is the Doppler power spectral density, (DPSD) denoted as S(v).

The wideband channels that allow to express their dispersion function separable by the multiplication of two independent density functions, have their scattering function defined as a Separable Scattering Function (SSF), as it is shown as follows:

$$S(v,\tau) = P(\tau)S(v), \quad \text{(VIII)}$$

this means that in each delay value T the same Doppler spectral density is observed S(v), only with different average power given by the delay power profile P(τ).

Likewise, doubly selective channels which have a non-separable scattering function (NSSF), describe jointly the average power density observed for a given value of delay time and Doppler frequency (v,τ). In this way, a NSSF dispersion function is more representative for a real channel, therefore the dispersion function S(v,τ) cannot be expressed in terms of the multiplication of two independent distributions as in equation (VIII).

The aforementioned simplifications allow reducing the statistical information of a tensor, $R_{c_{bb}}(t, s; \tau, \xi)$ to a two-dimensional function $R_{c_{bb}}(\Delta t; \tau)_{est}$, or its equivalent in Fourier, the dispersion function. This simplification is the used in the approaches followed by the commercial implementations for channel emulators, which are currently based only on methods of simulation for channels with SSF, which are even only stationary. Therefore, they cannot simulate real channels because the DPSDs that can be reproduced, are the same at each time delay value τ and simulation time.

However, numerous measurements have indicated the need to contemplate non-stationarity of the channel in a relatively short time interval in order to make a channel simulator/emulator more realistic. In this scenario, either both the SSF or NSSF dispersion functions, vary over time. Hence, the dispersion function will evolve over time S(t; v, τ) according to a propagation environment with non-stationary statistics. Furthermore, this non-stationarity must be considered due to the fact that the dispersion function, for the most realistic case, is non-separable, and even that the trajectories are non-decorrelated for different time-delays.

BRIEF DESCRIPTION OF THE INVENTION

In the present invention, a new communication channel simulation/emulation method and apparatus for generating channel realizations with NSSF where statistics are non-stationary and the multipaths can be correlated, is presented. The invention is based on the concatenation of independent sequences of channel realizations made from the Karhunen-Loève expansion method (KLE), which are parameterized based on an analysis made of the orthogonalization of the channel with NSSF dispersion function. The present invention makes use of the orthogonalization technique of the communications channel, which was also used in our invention called "Emulador de Canal Doblemente Selectivo, estacionario o No-estacionario en tiempo, con Función de Dispersión No-Separable". It should be mentioned that the cited patent also focuses on the simulation/emulation of non-stationary channels and with non-separable dispersion function; however, such patent considers stationarity in the statistics within a certain time interval, whereas the invention presented in this document, considers that the statistics are locally non-stationary.

Likewise, the concatenation of the stochastic processes generated by the emulator presented in the present invention is obtained by means of the method presented in our patent "Método y aparato de generación de realizaciones de canal estacionarias y no-estacionarias de longitud arbitraria".

DETAILED DESCRIPTION OF THE INVENTION

Figure 1:
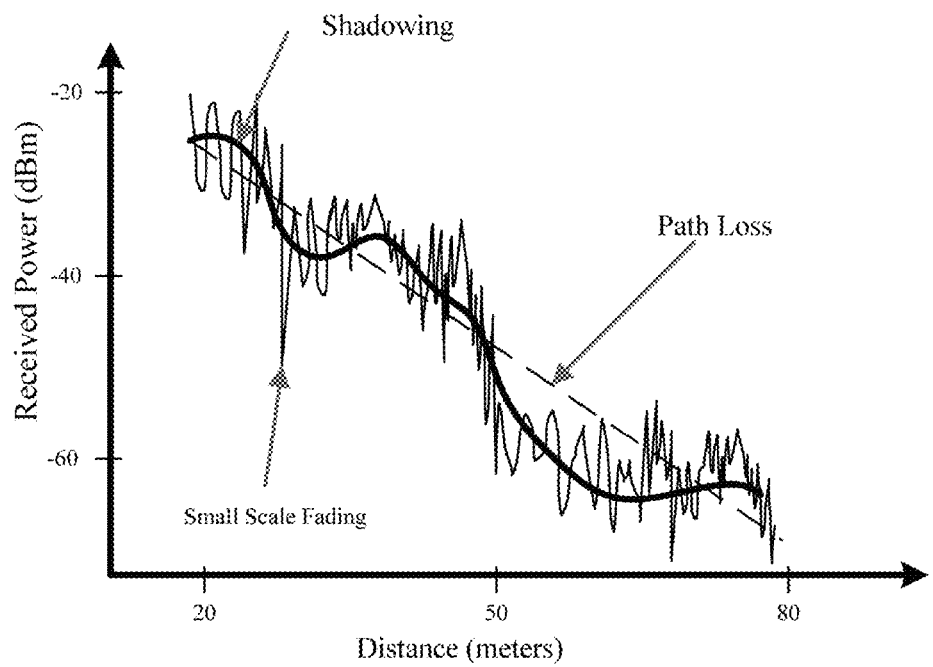
FIG. 1 shows an example of the variations of power received in a channel with multipath, with different observation ranges.

Ortogonalizaction of the Wireless Communication Channel.

A communication channel given by a real multipath propagation environment, where there is relative mobility between transmitter and receiver, results in a behavior whose statistics are doubly dispersive, that is, it presents dispersion in both the time delay domain and in the Doppler frequency domain. Therefore, the simulators and channel emulators to be designed must be parameterized from separable (SSF) or non-separable (NSSF) dispersion functions, and according to the locally non-stationary conditions that they wish to reproduce. So a factor of crucial importance is the complexity in the design of the channel simulator/emulator, which will depend on the dimensionality of the channel model, as well as its maximum values of maximum frequency Doppler $f_{Dmax}$ and maximum delay $\tau_{max}$. Whereby if relevant M discrete trajectories are considered, the channel model is described as follows:

$$c_{bb}(t;\tau) = \sum_{m=0}^{M-1} \mu_m(t)\delta(\tau - \tau_m). \tag{IX}$$

Note that in the previous equation, the dispersion delay $\tau_{M-1}$, commonly denoted as $\tau_{max}$, corresponds to the maximum dispersion of the channel in the time domain of delay. To be able to parameterize a simulator/emulator to statistically approximate a channel with NSSF, the present invention proposes the utilization of the channel orthogonalization method, which performs the channel expansion from a finite and reduced set of eigen functions $\psi_\varsigma(\tau)$ and whose method is presented in greater detail in the doctoral thesis of one of the authors of this invention [REF4] as well as in the patent "Emulador de Canal Doblemente Selectivo, estacionario o No-estacionario en tiempo, con Función de Dispersión No-Separable". To achieve channel expansion from a finite and reduced set of eigen functions, it is necessary to consider a frequency observation window (corresponding to the bandwidth of the signal of interest), so it can be considered that the channel has been limited within a band of frequencies by a filter $g(\tau)$. Resulting in the band-based baseband channel model as:

$$h_{bb}(t;\tau) = c_{bb}(t;\tau) * g(\tau) = \sum_{m=0}^{M-1} \mu_m(t)g(\tau - \gamma_m). \tag{X}$$

Figure 4:
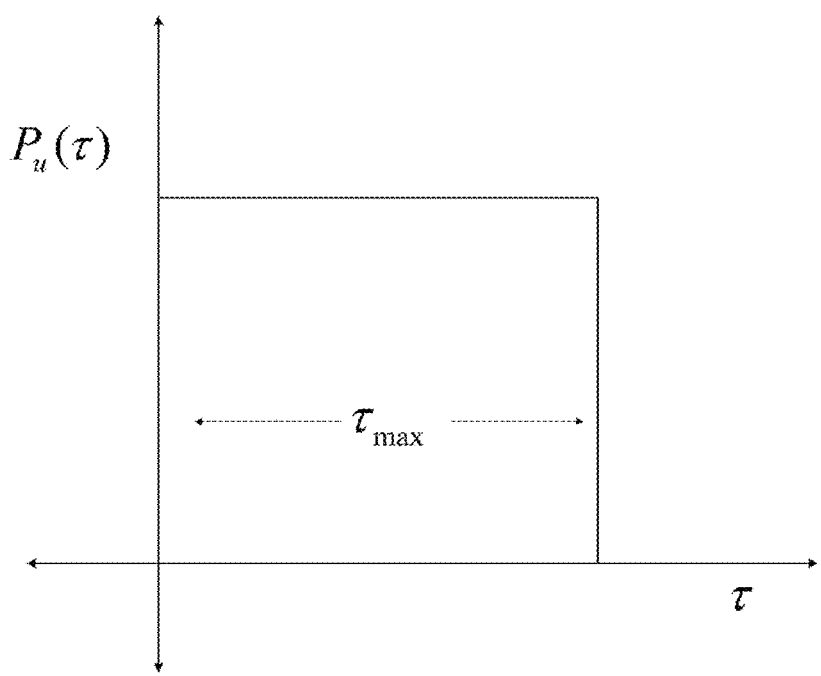
FIG. 4 illustrates the universal power profile, which is used to obtain a super space to apply the channel orthogonalization technique.

This channel has a finite dimensionality, so it can be expanded as shown below:

$$h_{bb}(t;\tau) = \sum_{\varsigma=1}^{L_{min}} \zeta_\varsigma(t)\psi_\varsigma(\tau), \quad (XI)$$

this representation of the channel characterizes the wireless channel by means of "non-physical trajectories", that is, with propagation trajectories without physical meaning, which allows to obtain a reduction of the dimensionality in the time-delay domain, which in principle is infinite, to only $L_{min}$ components, or stochastic processes $\zeta_\varsigma(t)$. The functions that will be used to expand the channel's realizations, $\psi_\varsigma(\tau)$, must be able to represent any channel realization of any SSF or NSSF considered during a simulation, so it can be shown that a solution consists of obtaining these functions from the decomposition in eigenvectors $\psi_\varsigma(\tau)$ y eigenvalues $\lambda_\varsigma$, of a universal correlation function, $R_U(\tau,\xi)$ [REF6]. This universal correlation function is formed from a correlation function of a non-stationary and non-correlated stochastic process $P_U(\tau, \xi)$ which has values of one in its diagonal, for the time from zero to the maximum $\tau_{max}$ considered in the SSF or NSSF that will be considered in the simulation, that is:

$$P_U(\tau, \xi) = \delta(\tau-\xi), \tau, \xi \in \{0, \max(\tau_{max})\}, \quad (XII)$$

where $P_U(\tau, \xi)$ is here called as "two-dimensional universal profile", and its diagonal function, $P_U(\tau)$, is hereafter named as the "universal power profile", shown in FIG. 4. This two-dimensional universal profile is then doubly convolved by band-limiting filters $g(\tau)$ and $g(\xi)$, in the domains $\tau$ y $\xi$, respectively, to finally generate the universal correlation function $R_U(\tau,\xi)$, a i.e.:

$$R_U(\tau,\xi) = \int_{-\infty}^{\infty}\int_{-\infty}^{\infty} P_U(\tau,\xi)g(\tau)g(\xi)d\tau d\xi. \quad (XIII)$$

The processes $\zeta_\varsigma(t)$ in equation (XI) are obtained through the projection of the basis function set, $\psi_\varsigma(\tau)$, with the channel that has to be transformed into the subspace, as shown below:

$$\zeta_\varsigma(t) = \langle h_{bb}(t;\tau), \psi_\varsigma(\tau) \rangle \quad (XIV)$$

In this way, the correlation of the processes $\zeta_\varsigma(t)$ will provide with statistically important information to determine how dispersive the channel is, how stationary it is, as well as the dimensionality of the channel once the orthogonalization has been applied. Therefore, the correlation between two processes is defined as follows:

$$R_{\varsigma_\kappa}(t,s) = E\{\zeta_\varsigma(t)\zeta_\kappa^*(s)\}, \quad (XV)$$

where if the process $\zeta_\varsigma(t)$ is defined from equation XIV as:

$$\zeta_\varsigma(t) = \int_{-\infty}^{\infty} h_{bb}(t;\tau)\psi_\varsigma(\tau)d\tau, \quad (XVI)$$

the correlation would be defined as shown below:

$$R_{\varsigma_\kappa}(t,s) = E\{\int_{-\infty}^{\infty} h_{bb}(t;\tau)\psi_\varsigma(\tau)d\tau \int_{-\infty}^{\infty} h_{bb}^*(s;\xi)\psi_\kappa(\xi)d\xi\}, \quad (XVII)$$

$$R_{\varsigma_\kappa}(t,s) = \int_{-\infty}^{\infty}\int_{-\infty}^{\infty} R_{h_{bb}}(t,s;\tau,\xi)\psi_\varsigma(\tau)\psi_\kappa(\xi)d\tau d\xi. \quad (XVIII)$$

Therefore, if we assume stationarity in the wide sense of channel behavior, the statistics of fading or distortions due to Doppler scattering will not change with respect to time. In the patent "Emulador de canal doblemente selectivo, estacionario o no-estacionario en tiempo, con función de dispersión no-separable", we presented the method and apparatus that implements this modality as well as the modality where the channel is approached as stationary in short-time, whereby in larger observation windows, the channel can be treated as non-stationary.

However, if you want to emulate a real and highly variant propagation environment, and also knowing that such wireless channel $h_{bb}(t;\tau)$ in reality is non-stationary within short time intervals (comparable to the duration of a transmitted symbol or data frame), and correlated in the time domain of delay $\tau$ and in the temporal domain t; then the emulator to be designed must be able to generate channel realizations that possess the correlation defined by $R_{h_{bb}}(t, s; \tau, \xi)$ completely. Therefore, the channel correlation $R_{h_{bb}}(t,s; \tau, \xi)$ describes the correlation between the sample in $\langle t, \tau \rangle$ with the sample in $\langle s, \xi \rangle$; Hence, the correlation introduced by the filtering stages within the transmitter and receiver is considered, as well as the correlation of the physical trajectories in the propagation environment. Then, applying the orthogonalization technique to the correlation tensor $R_{h_{bb}}(t, s; \tau, \xi)$, the correlation seen in all domains will be maintained. This allows to obtain a finite size tensor $\mathcal{R}_{\varsigma_\kappa}(t, s)$ because the dimensionality seen in the delay domain $\tau$ and $\xi$ is infinite.

Therefore, in this invention it is explained the method and apparatus that will generate the channel realizations corresponding to the correlation tensor $R_{h_{bb}}(t,s; \tau, \xi)$ of a channel reproducing exactly the correlation between the sample in $\langle t, T \rangle$ with the sample $\langle s, \xi \rangle$ and whose channel dispersion function can be non-separable or separable, for environments where the channel is non-stationary.

FIG. 1 shows an example of the variations of power received in a channel with multipath, on different observation ranges, where it can be seen that the factors that mainly affects the variability of the channel, such as the fading of long and small scales, for a space of local observation time, could be separated as a product for the stationary case.

Figure 2:
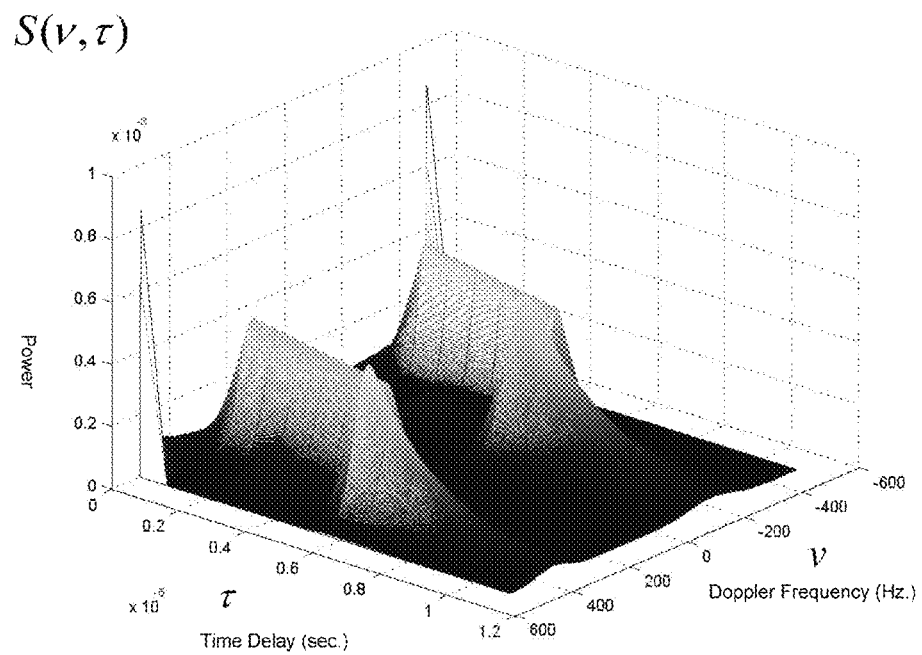
FIG. 2 shows an example of the non-separable dispersion function of a doubly dispersive communications channel in time-delay $\tau$ and Doppler frequency $v$.

FIG. 2 shows an example of the non-separable dispersion function of a doubly dispersive communications channel in time delay $\tau$ and Doppler frequency v; where it can be seen that the delay power profile $P(\tau)$ is different for each Doppler frequency value v. Likewise, the delay power profile observed in each Doppler frequency value v can be continuous or discrete.

Figure 3:
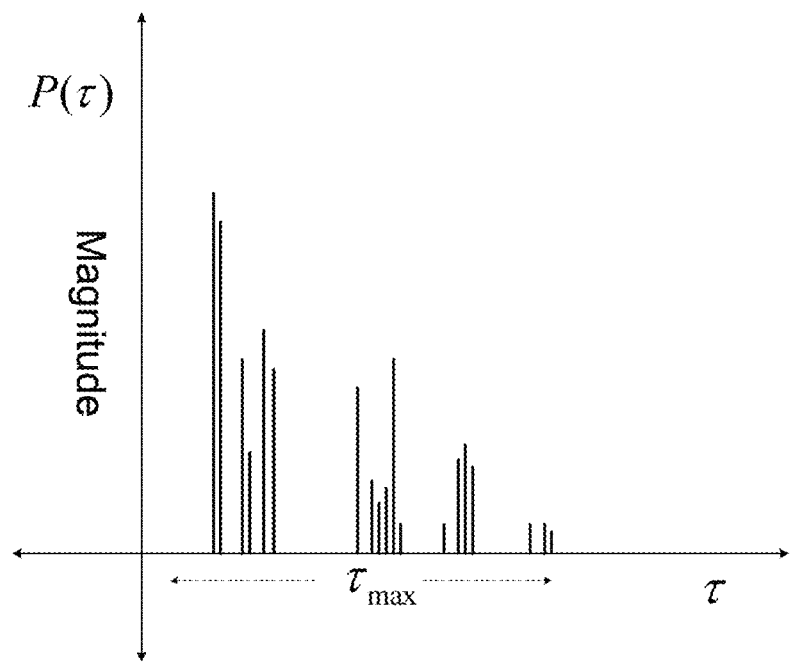
FIG. 3 shows an example of a discrete delay power profile $P(\tau)$.

FIG. 3 shows an example of a discrete power delay profile $P(\tau)$ with identifiable components, where the maximum delay parameter is observed, $\tau_{max}$, which determines the maximum delay value that must be considered when defining a relevant power value. FIG. 4 illustrates the universal power profile, which is employed for obtaining a superspace to apply the channel orthogonalization technique, which allows obtaining a set of eigenvalues and eigenfunctions; this set allows the expansion of any power delay profile, whether continuous or discrete, where the highest energy of the delay is within the maximum delay parameter $\tau_{max}$, since the channel is required or observed in a finite bandwidth.

Figure 5:
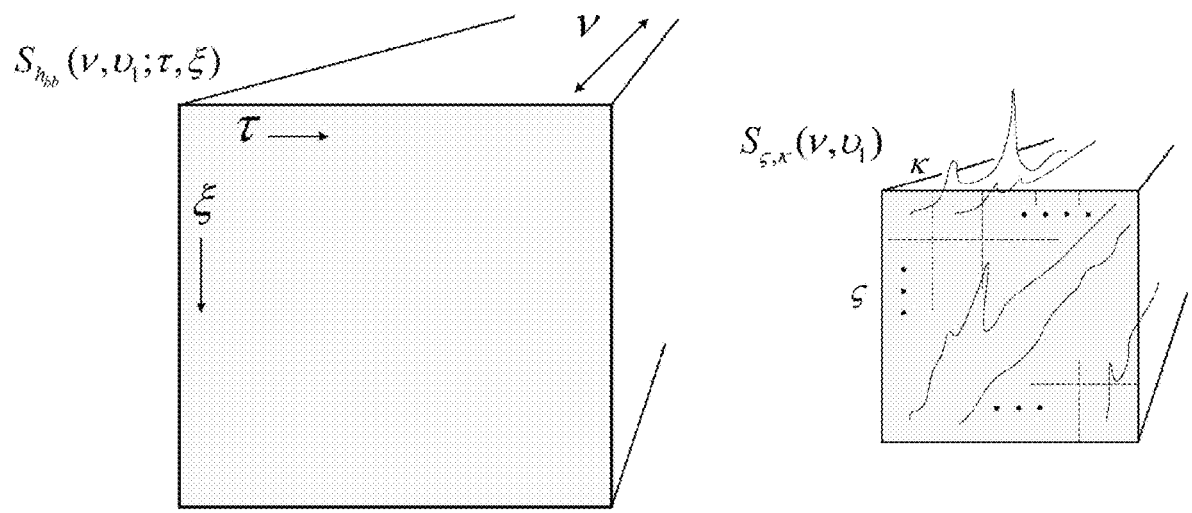
FIG. 5 shows the correlation tensor $R_{h_{bb}}(t,s;\tau,\xi)$ in the domain of Doppler frequencies $v$ and $\nu$, for the frequency value $v=v_1$, and the reduction that is made in the dimensionality in the time domain of delay given by $\tau$ and $\xi$.

FIG. 5 shows the correlation tensor $R_{h_{bb}}(t,s; \tau, \xi)$ in the frequency domains v, v for the frequency value $v=v_1$, and the reduction that is made in the dimensionality in the time domain of delay given by $\tau$ and $\xi$. This reduction in dimensionality is achieved using the channel orthogonalization technique, in order to obtain a correlation tensor $R_{\varsigma_\kappa}(t, s)$ with finite dimensionality given by the indices $\varsigma$ and $\kappa$.

Figure 6:
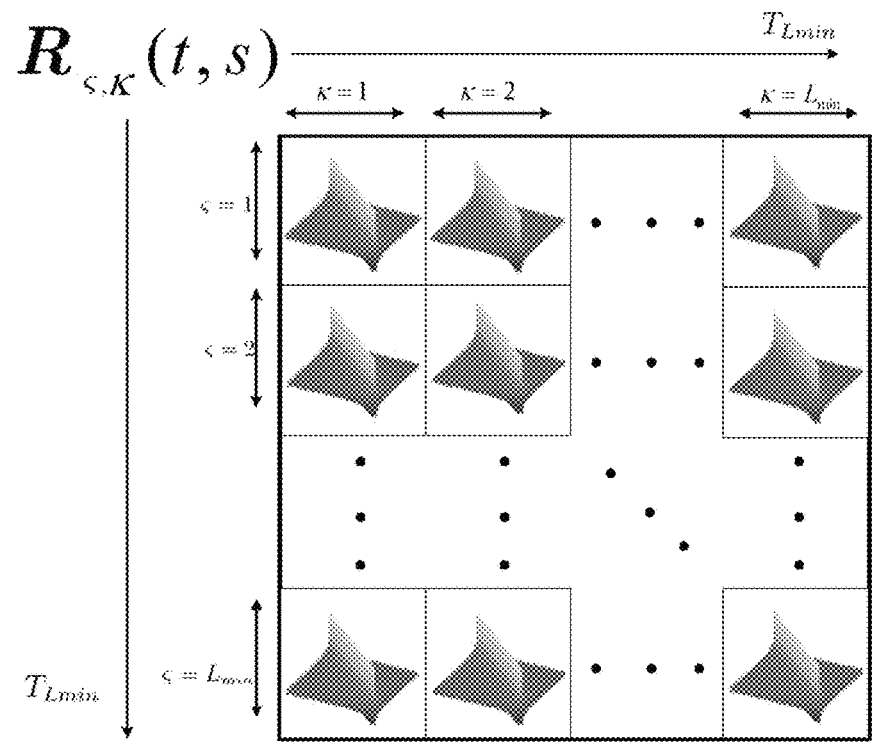
FIG. 6 illustrates the rearrangement of the tensor $R_{\varsigma\kappa}(t,s)$ as a matrix of correlation matrices $\mathcal{R}_{\varsigma\kappa}(t, s)$, for this example, all processes are considered to have the same autocorrelation and cross-correlation for having an SSF.

FIG. 6 illustrates the rearrangement of the tensor $R_{\varsigma\,\kappa}(t,s)$ as a matrix of correlation matrices $\mathcal{R}_{\varsigma\,\kappa}(t, s)$ with the objective of observing the correlation of the non-physical or virtual delay domain given by the coordinate index $(\varsigma, x)$ and the corresponding time correlation matrix observed in the interval 0<t<T y 0<s<T. For this example, all processes are considered to have the same autocorrelation and cross-correlation, that is, they correspond to an SSF.

Figure 7:
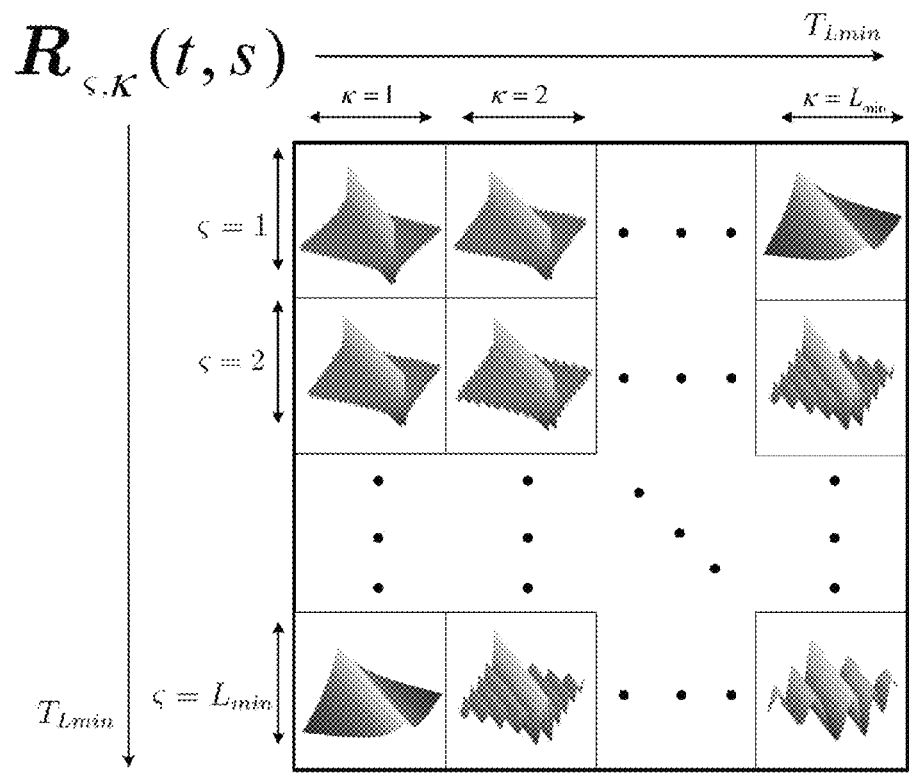
FIG. 7 illustrates how the correlation matrices of each coordinate pair are observed ($\varsigma$, $\kappa$) in the rearrangement of the tensor $R_{\varsigma\kappa}(t,s)$ as a matrix of correlation matrices $\mathcal{R}_{\varsigma\kappa}(t, s)$, when dealing with NSSFs.

FIG. 7 illustrates how the correlation matrices of each coordinate pair are observed $(\varsigma, \kappa)$ in the rearrangement of the tensor $R_{\varsigma\,\kappa}(t,s)$ as a matrix of correlation matrices $\mathcal{R}_{\varsigma\,\kappa}(t, s)$, when dealing with a NSSF.

Figure 8:
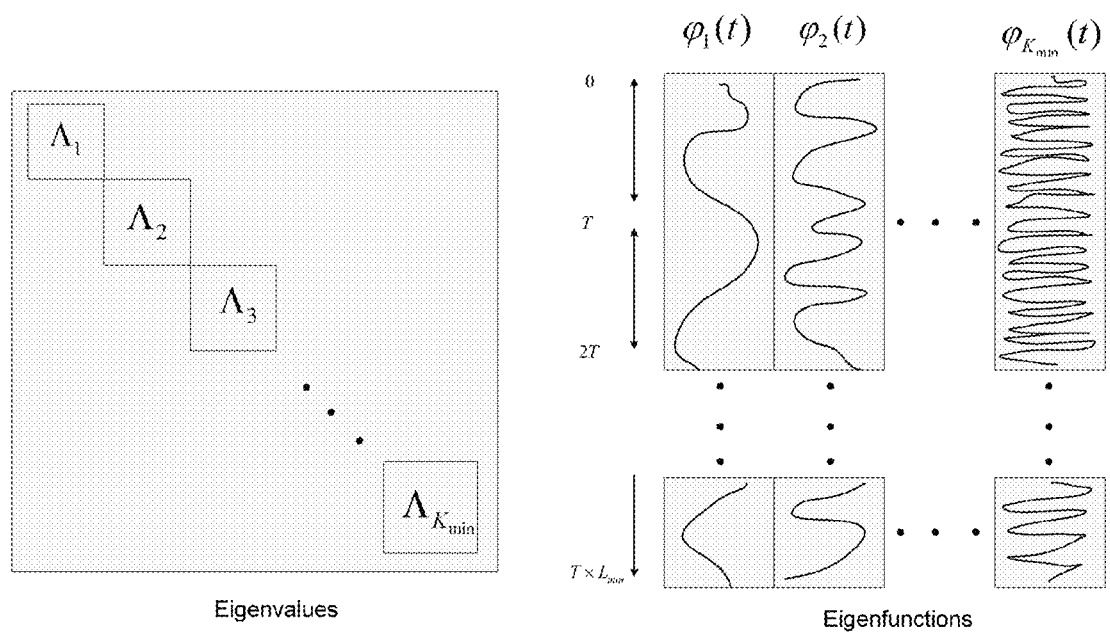
FIG. 8 shows the set of eigenvalues $\Lambda_\kappa$ and eigenfunctions $\varphi_\kappa(t)$ obtained from the eigen-decomposition of the matrix of correlation matrices $\mathcal{R}_{\varsigma\kappa}(t, s)$.

FIG. 8 shows the set of values $\Lambda_\kappa$ and base functions $\varphi_\kappa(t)$, obtained from the eigen-decomposition of the matrix of correlation matrices $\mathcal{R}_{\varsigma\,\kappa}(t,s)$. Additionally, it is observed that the set of eigenfunctions $\varphi_\kappa(t)$ and eigenvalues $\Lambda_\kappa$ will expand realizations of a process conformed by $L_{min}$ realizations $\zeta_\varsigma(t)$ where each of the realizations $\varsigma=1, 2, \ldots, L_{min}$ is defined in the interval 0<t<T.

Figure 9:
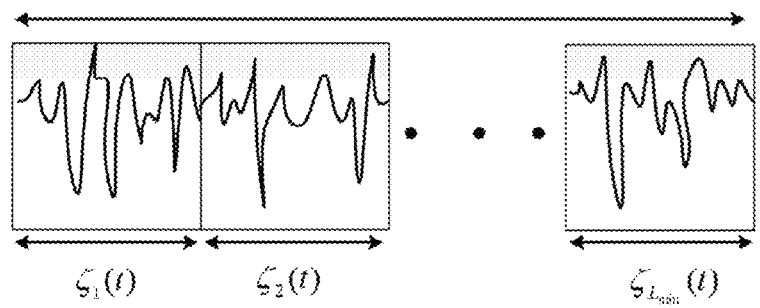
FIG. 9 illustrates an example of a process $\xi(t)$ formed by $L_{min}$ realizations $\zeta_\varsigma(t)$ where each of the realizations $\varsigma$ 32 1, 2, ..., $L_{min}$ is defined in the same interval $0<t<T$.

FIG. 9 illustrates an example of a process $\xi(t)$ conformed by $L_{min}$ realizations $\zeta_\varsigma(t)$ where each of the realizations $\varsigma=1, 2, \ldots, L_{min}$ is defined in the same interval 0<t<T.

Figure 10:
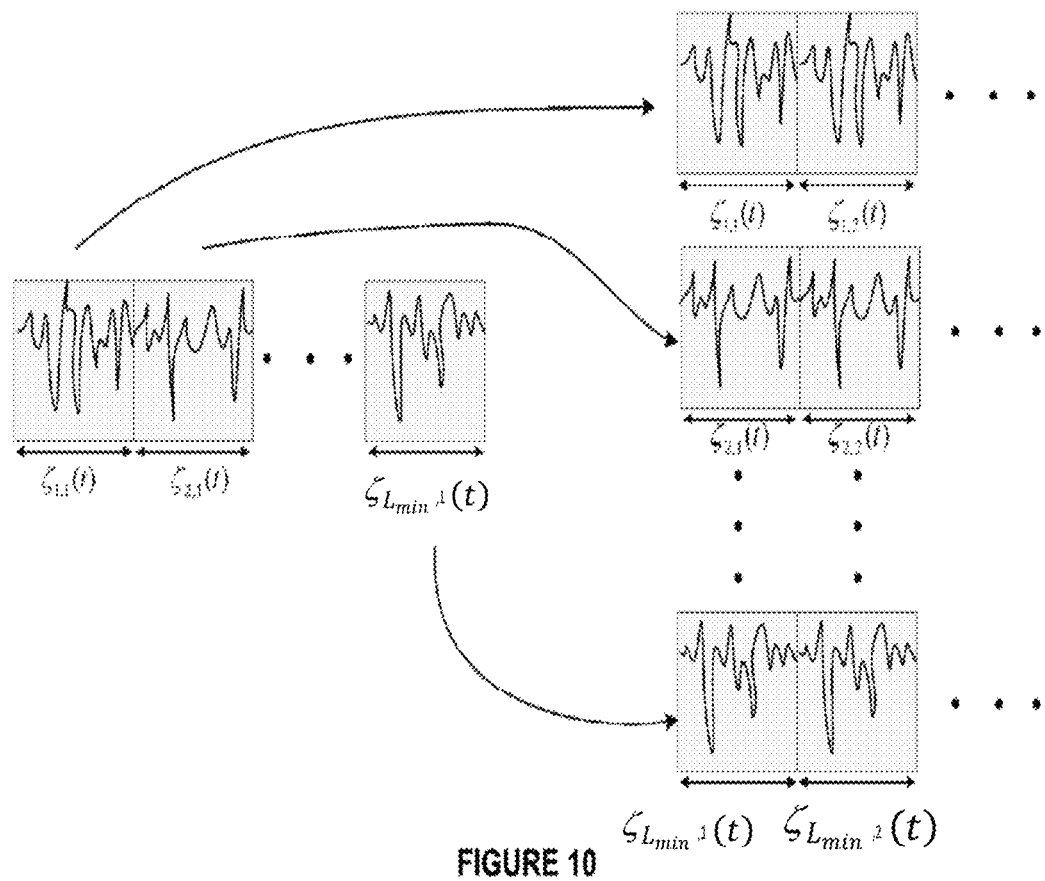
FIG. 10 describes the required rearrangement of the process $\xi(t)$.

FIG. 10 describes the required rearrangement of the process $\xi(t)$ according to the number of the process $\varsigma=1, 2, \ldots, L_{min}$; in this way, channel realizations are generated for $l=1, 2, \ldots, \infty$ and the realizations are concatenated $\zeta_{\varsigma\,l}(t)$ for obtaining $L_{min}$ arbitrarily long processes.

Figure 11:
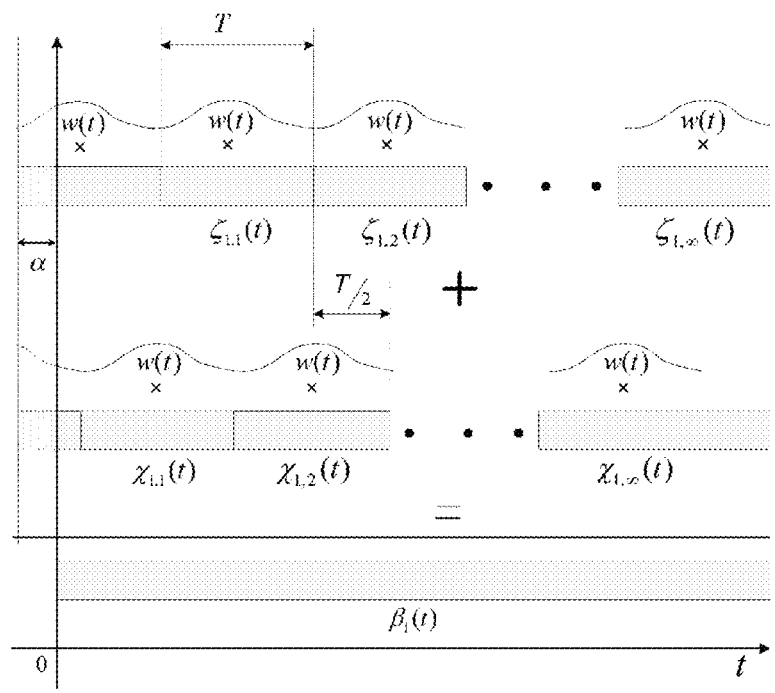
FIG. 11 shows the process of windowing and delay $\alpha$ associated with the realizations of the sequences $\zeta_{\varsigma,i}(t)$ and $\chi_{\varsigma,i}(t)$ for obtaining $\beta_\varsigma(t)$ for $\varsigma=1$.

FIG. 11 shows the window process with w(t) for each of the realizations of the sequences $\zeta_{\varsigma\,l}(t)$ and $\chi_{\varsigma\,l}(t)$ and the application of the associated delay $\alpha$, to consequently add the two sequences and thus forming the arbitrarily long process $\beta_\varsigma(t)$ for $\varsigma=1$.

Figure 12:
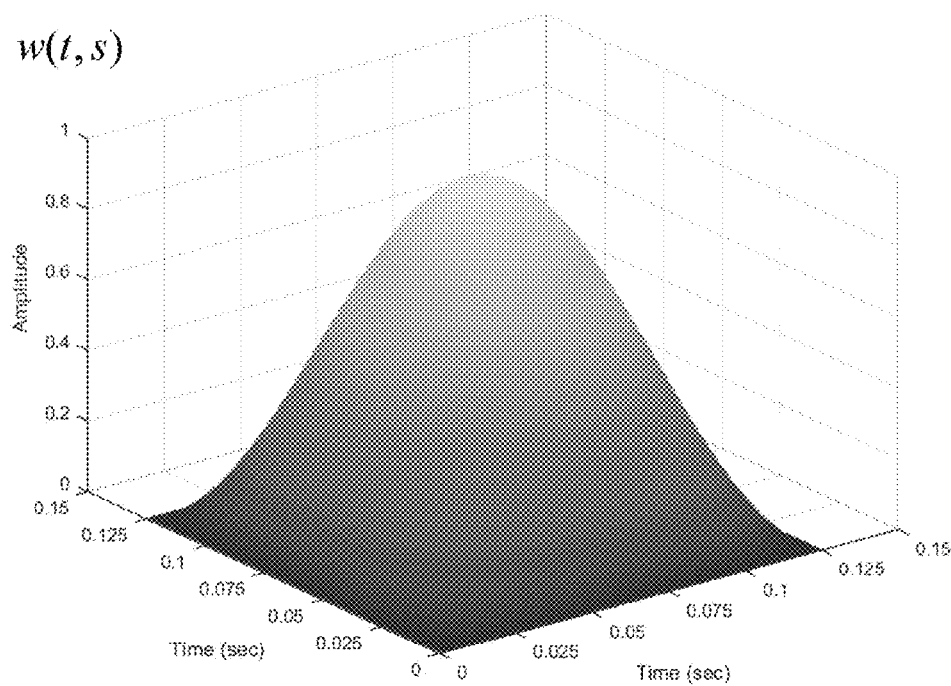
FIG. 12 shows the two-dimensional window $w(t,s)$ as an additional function to modify the matrix of correlation matrices $\mathcal{R}_{\varsigma\kappa}(t,s)$.

FIG. 12 shows the two-dimensional window w(t,s) as an additional function to modify the matrix of correlation matrices $\mathcal{R}_{\varsigma\,\kappa}(t,s)$ and achieve a reduction in the number of eigenfunctions $\varphi_\kappa(t)$ and eigenvalues $\Lambda_\kappa$ required to expand the process $\xi(t)$ defined in the interval 0<t<T $L_{min}$.

Figure 13:
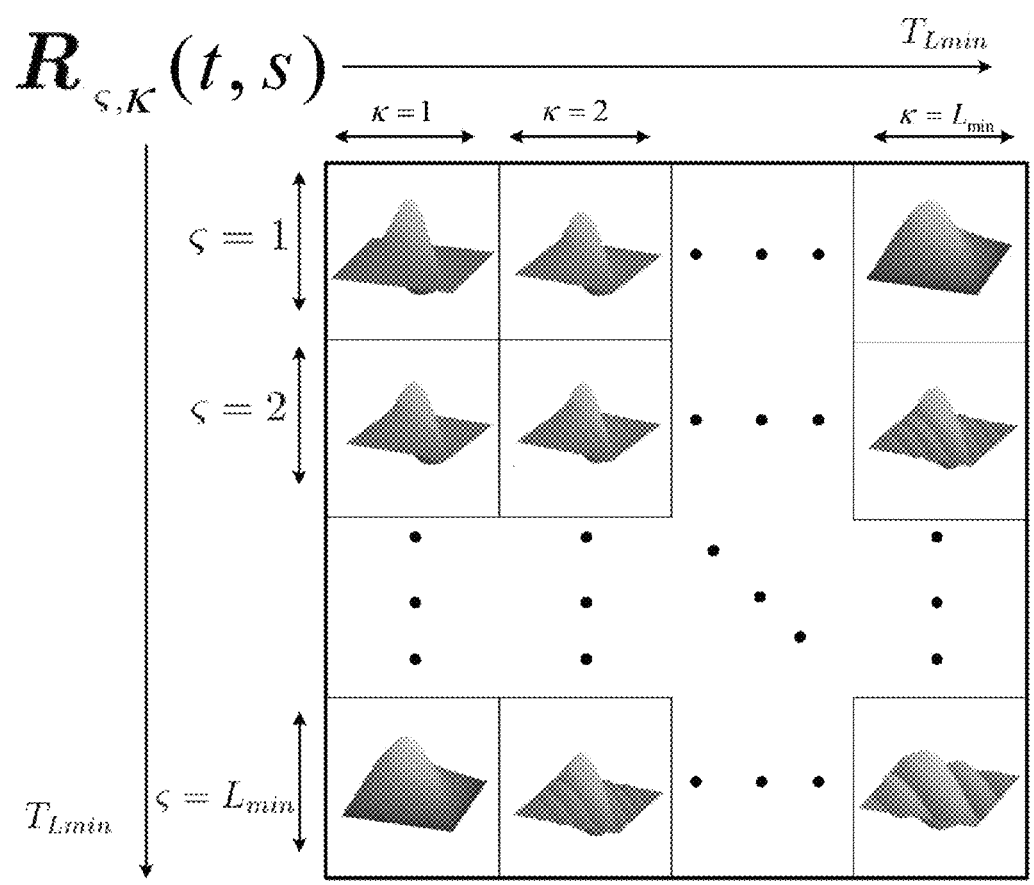
FIG. 13 shows an example of the modified matrix of matrices $\dot{\mathcal{R}}_{\varsigma\kappa}(t,s)$, from the windowing of $\mathcal{R}_{\varsigma\kappa}(t,s)$ by means of the two-dimensional filter $w(t, s)$.

FIG. 13 shows an example of the modified matrix of correlation matrices $\dot{\mathcal{R}}_{\varsigma\,\kappa}(t,s)$, from applying the windowing to $\mathcal{R}_{\varsigma\,\kappa}(t,s)$ by means of the bidimensional filter w(t, s).

Figure 14:
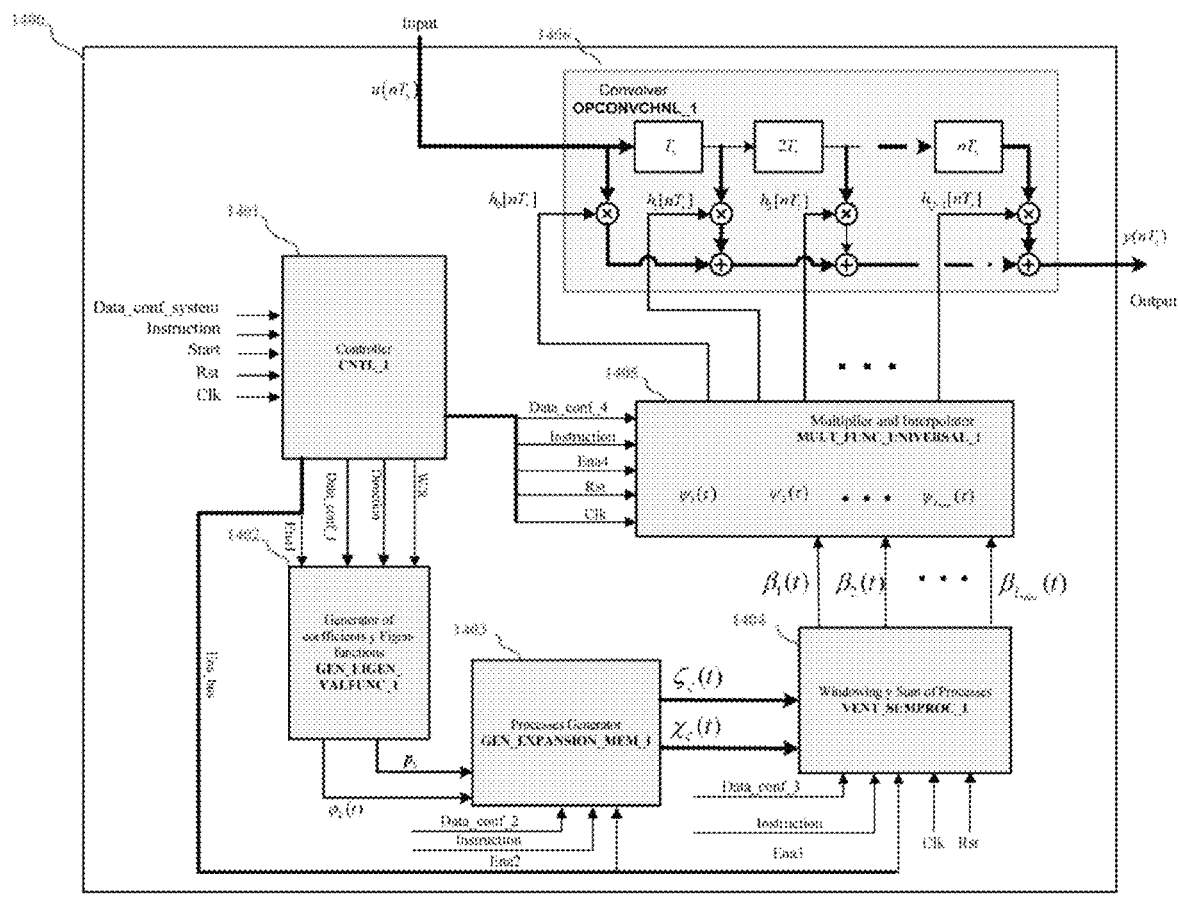
FIG. 14 shows the architecture 1400 of the generic doubly-selective channel emulator, locally non-stationary in time, non-stationary in frequency, and with non-separable scattering function of the present invention.

In FIG. 14 it is shown the architecture 1400 of the generic doubly selective channel emulator, locally non-stationary in time, non-stationary in frequency, and with non-separable dispersion function of the present invention, which consists of six main modules: the controller module 1401 CNTL_1, the module for generation of coefficients and basis functions 1402 GEN_EIGEN_VALFUNC_1, the module of stochastic processes generation 1403 GEN_EXPANSION_MEM_1, the module of windowing and sum of processes 1404 VENT_SUMPROC_1, the multiplying and interpolating module 1405 MULT_FUNC_UNIVERSAL_1 and the channel convolution module 1406 OPCONVCHNL_1.

Figure 15:
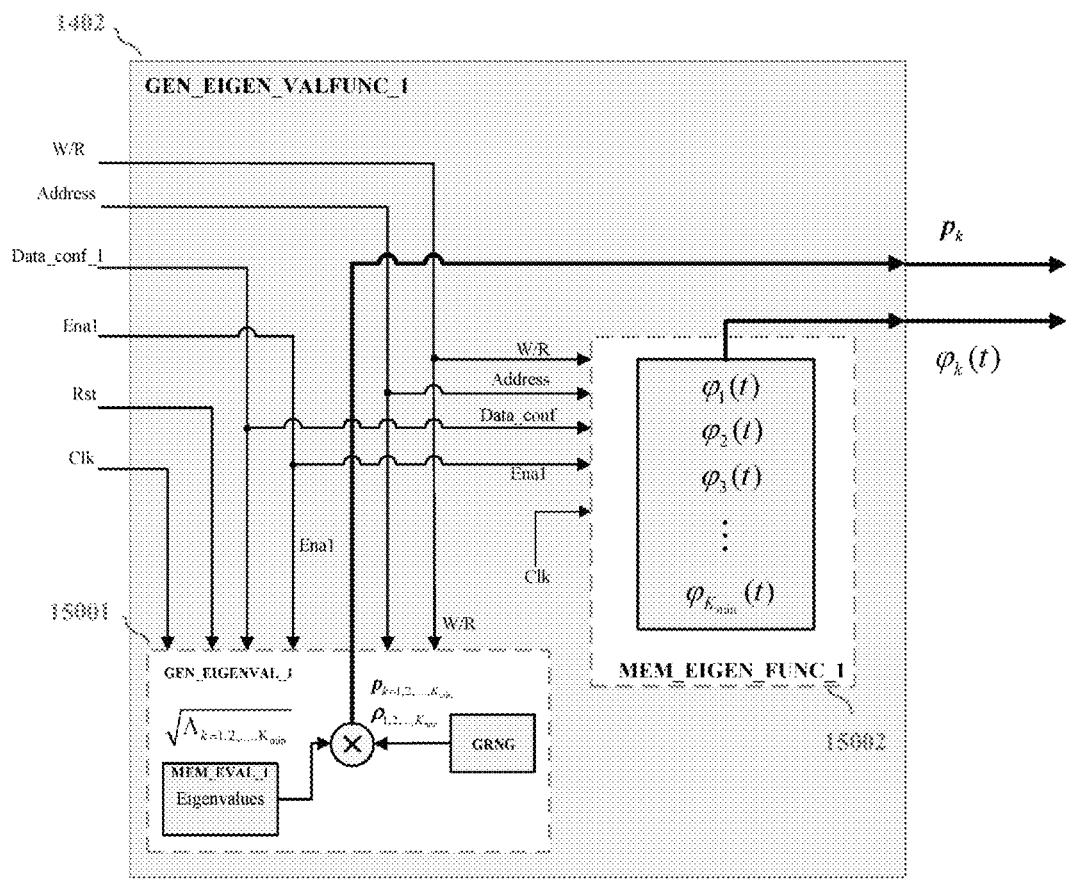
FIG. 15 illustrates the architecture of the coefficients and functions generator module 1402 GEN_EIGEN_VAL_FUNC_1.

FIG. 15 illustrates the architecture of the coefficient and function generator module 1402 GEN_EIGEN_VALFUNC_1 which is made up of two elements: the generator of random variables with predefined variance 15001 GEN_EIGENVAL_1, the module of storage and generation of eigenfunctions 15002 MEM_EIGEN_FUNC_1.

Figure 16:
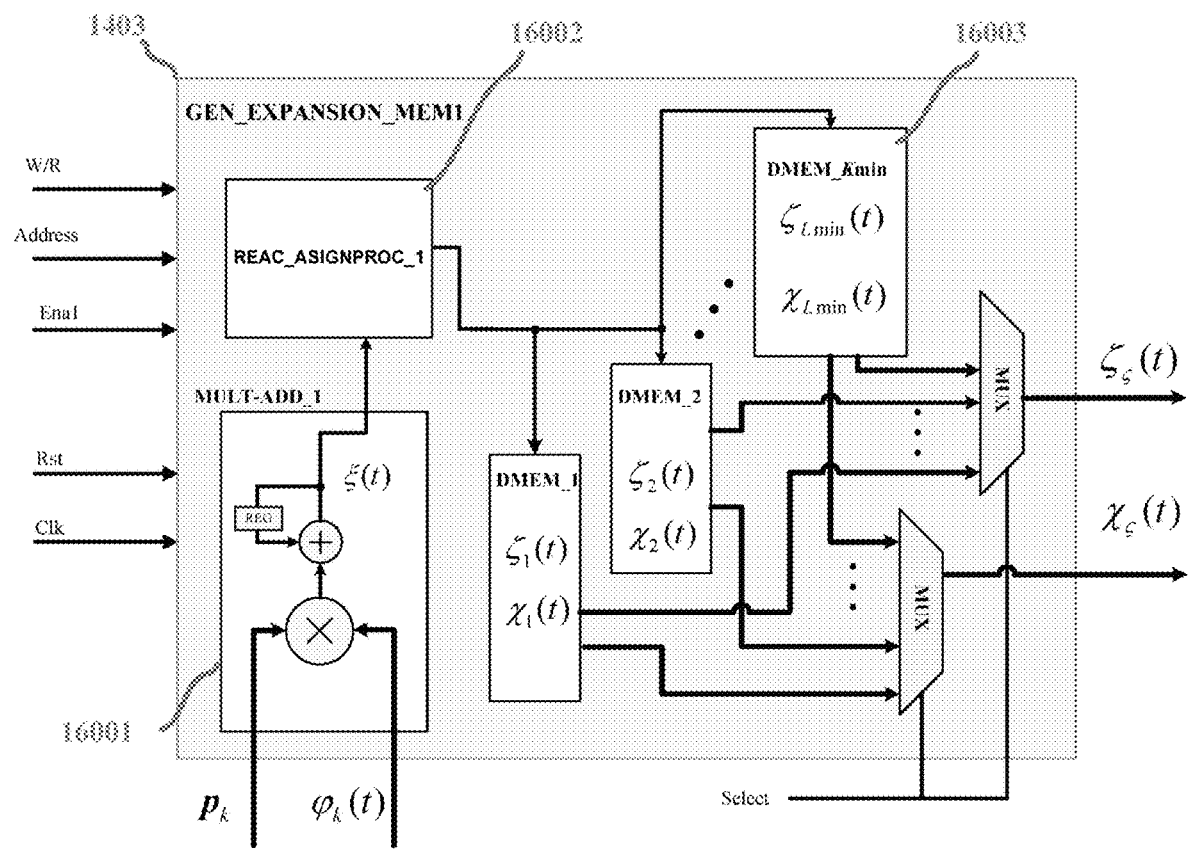
FIG. 16 shows the stochastic processes module 1403 GEN_EXPANSION_MEM_1.

FIG. 16 shows the stochastic process module 1403 GEN_EXPANSION_MEM_1 contains three submodules: the vector multiplication submodule 16001 MULT_ADD_1, the rearrangement module and allocation of generated processes $\xi(t)$ 16002 REAC_ASIFNPROC_1 and the block of type memories that store the sequences $\zeta_\varsigma(t)$ and $\chi_\varsigma(t)$ as indicated by the process index $\varsigma=1, 2, \ldots, L_{min}$, 16003 DMEM_1, DMEM_2, ..., DMEM_Kmin.

Figure 17:
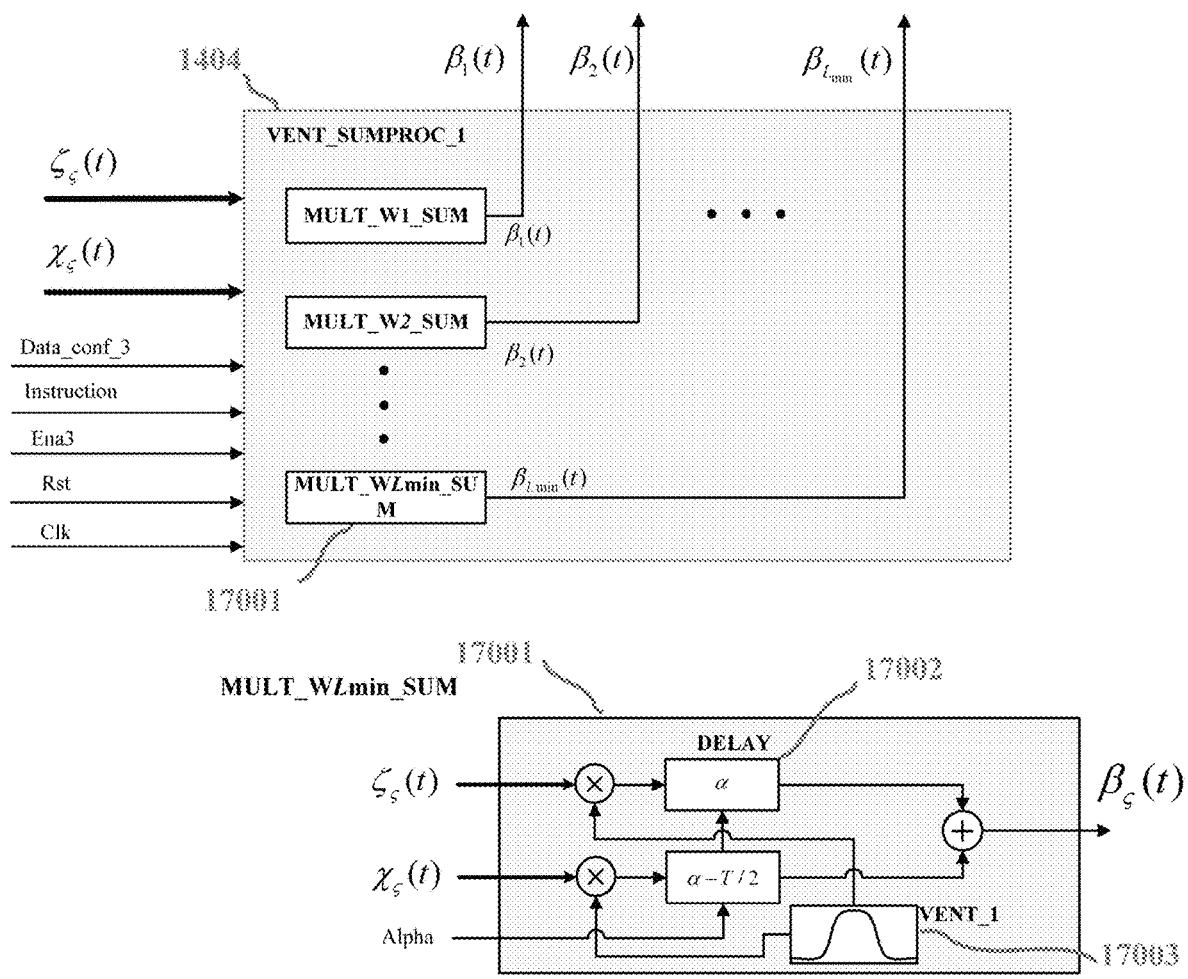
FIG. 17 shows the module of windowing and sum of processes 1404 VENT_SUMPROC_1.

FIG. 17 shows the module of windowing and sum of processes 1404 VENT_SUMPROC_1, which is conformed by $L_{min}$ stochastic process generator modules 17001 MULT_W1_SUM, MULT_W2_SUM to MULT_W2_SUM which are responsible for making a sum of the sequences $\zeta_\varsigma(t)$ and $\chi_\varsigma(t)$ in an specific manner for obtaining the processes $\beta_\varsigma(t)$ arbitrarily long. Each of the generators contains two submodules, the submodule 17002 DELAY is responsible for generating a time shift, and the submodule 17003 VENT_1 which is a block of memory initialized with the values of the windowing function w(t).

Figure 18A:
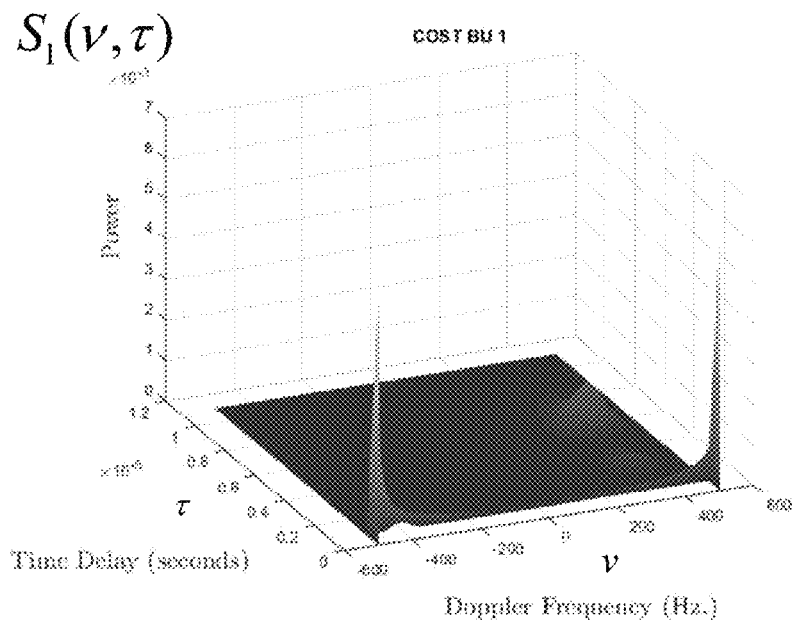
FIG. 18a and FIG. 18b show two non-separable scattering functions obtained from the COST-BU standard.
Figure 18B:
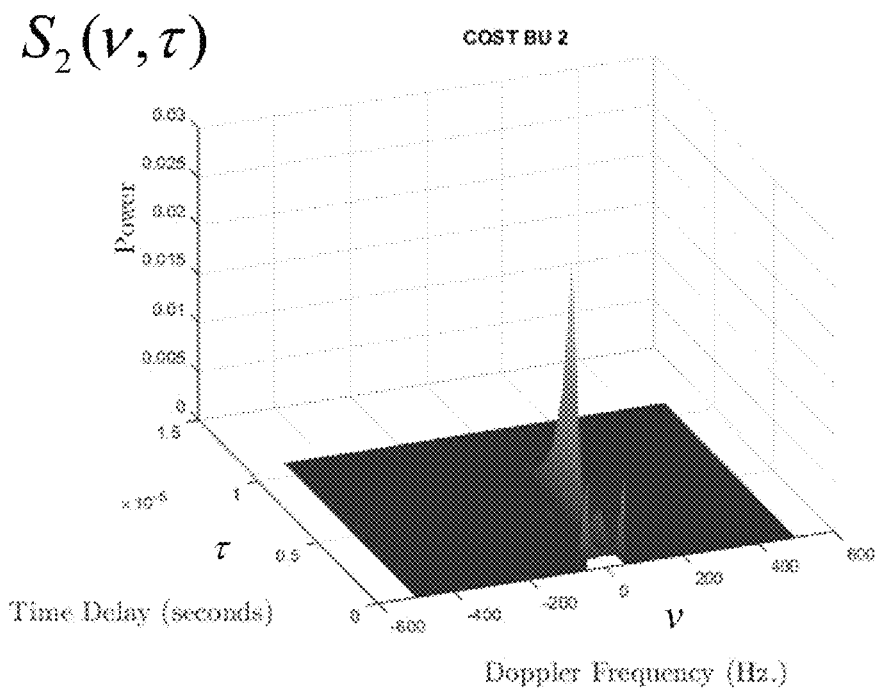

FIG. 18a and FIG. 18b show two NSSF obtained from the COST-BU standard, which are used to indicate that a channel can have different NSSF over time in the case of being non-stationary. These NSSF are used as an example of the system proposed in this invention, which demonstrates that it is feasible to generate continuous channel realizations and at the same time guarantee that the estimated NSSF is changing with respect to time for the locally non-stationary case.

Figure 19:
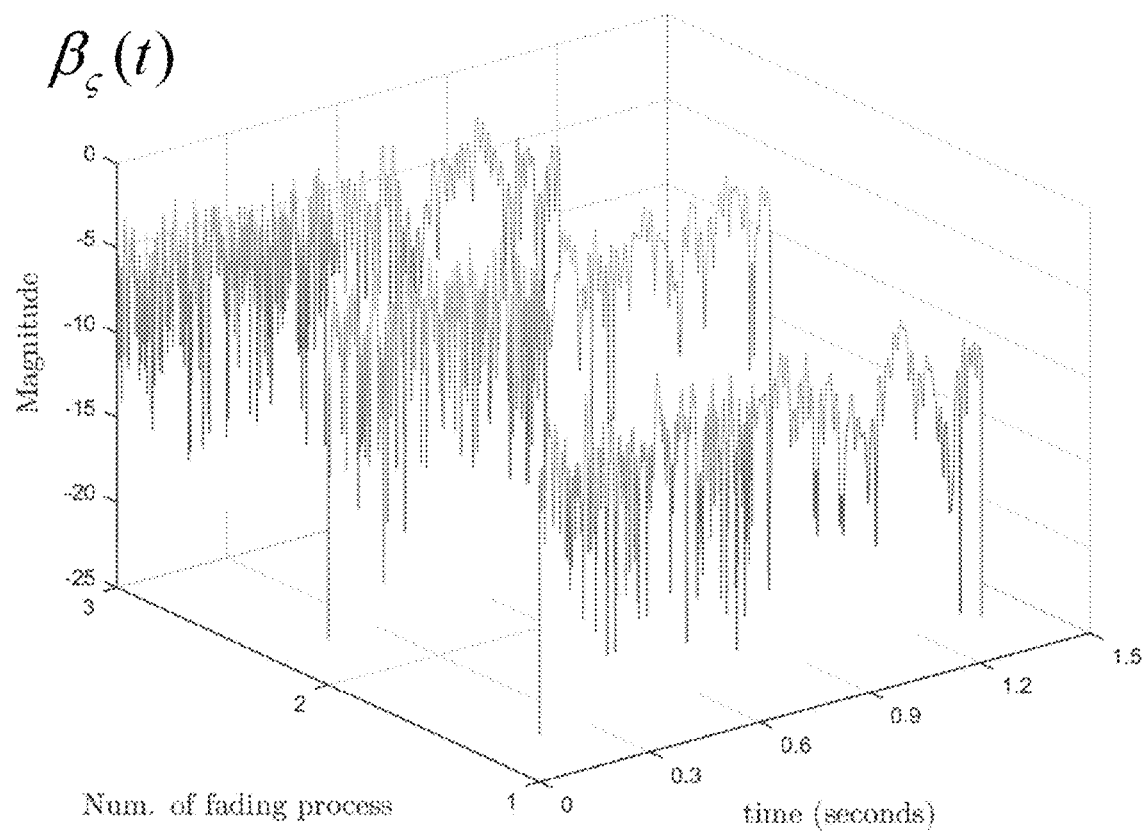
FIG. 19 shows the example of 3 independent channel realizations whose statistics of the dispersion function evolve over time.

FIG. 19 shows the example of 3 independent channel realizations whose statistics of the dispersion function evolve over time. For this example, the temporal selectivity is observed in the transition between two dispersion functions.

Figure 20A:
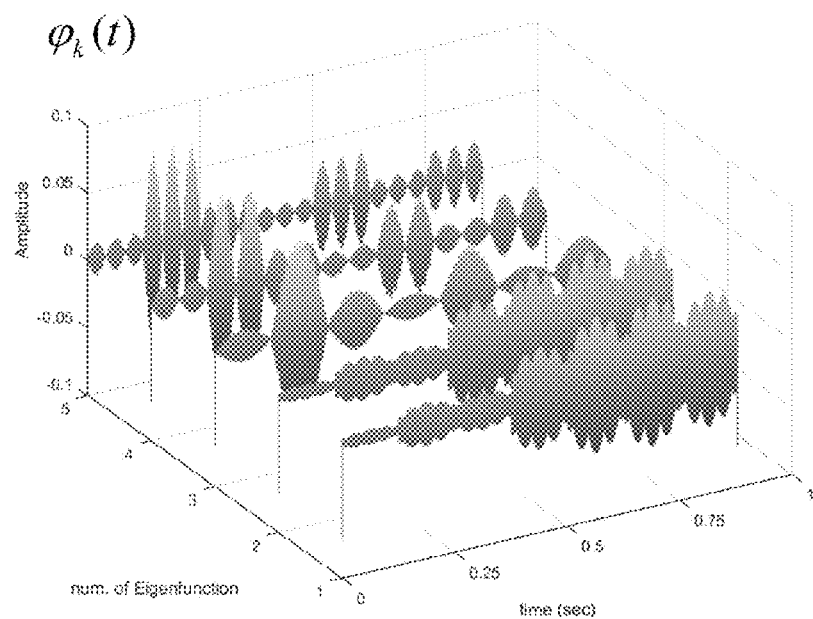
FIG. 20a shows an example of the first 5 basis functions $\varphi_\kappa(t)$, obtained from the eigen-decomposition of the matrix of correlation matrices $\mathcal{R}_{\varsigma\kappa}(t,s)$ of the considered example.

FIG. 20a shows an example of the first 5 basis functions $\varphi_\kappa(t)$, obtained from the eigen-decomposition of the matrix of correlation matrices $\mathcal{R}_{\varsigma\,\kappa}(t, s)$ of the considered example.

Figure 20B:
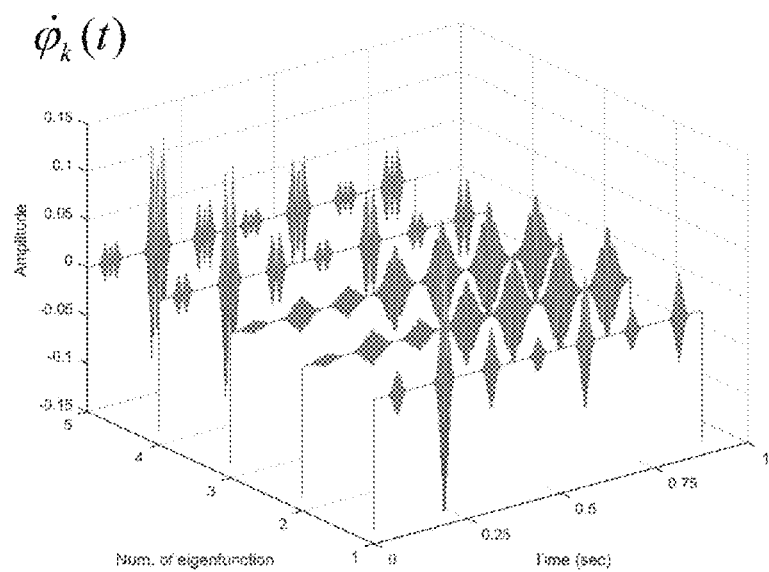
FIG. 20b shows an example of the first 5 basis functions $\dot\varphi_\kappa(t)$, obtained from the eigen-decomposition of the matrix of modified correlation matrices, $\dot{\mathcal{R}}_{\varsigma\kappa}(t,s)$. This modification is based on the windowing of $\mathcal{R}_{\varsigma\kappa}(t,s)$ by the filter or two-dimensional window $w(t,s)$ for each of the correlation matrices in $0<t<T$, $0<s<T$.
Figure 21A:
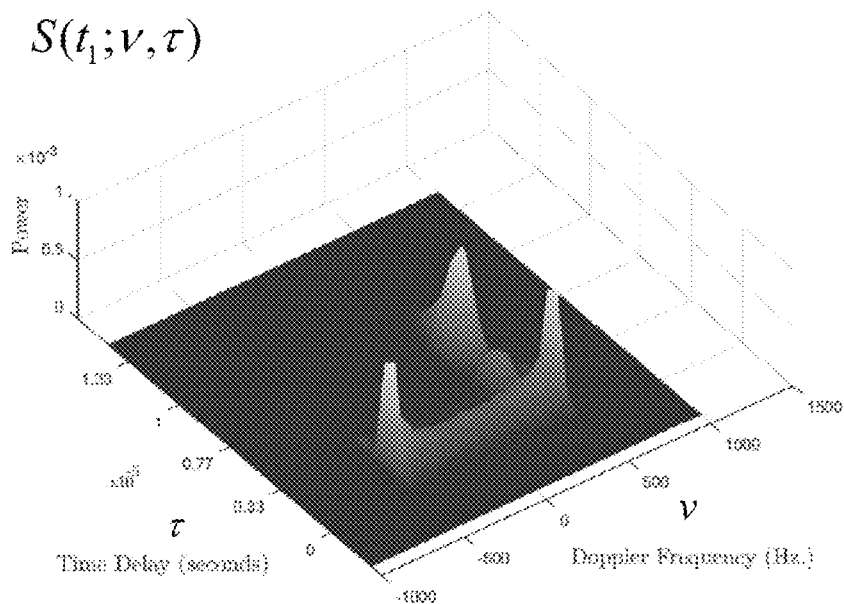
FIGS. 21a, 21b, 21c, 21d and 21e show the evolution of a variant NSSF in time, obtained by estimating channel realizations generated by a simulator/emulator using the present invention
Figure 21B:
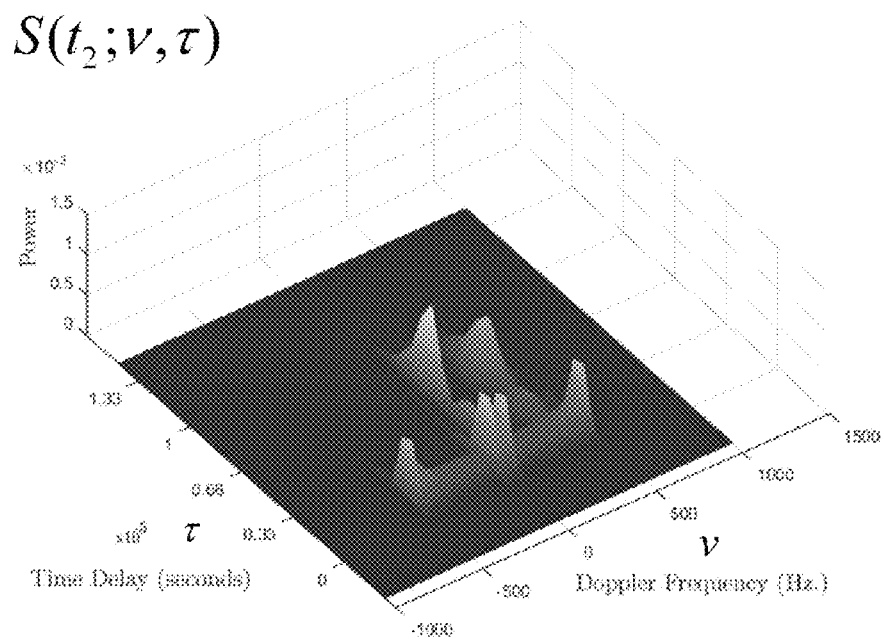
Figure 21C:
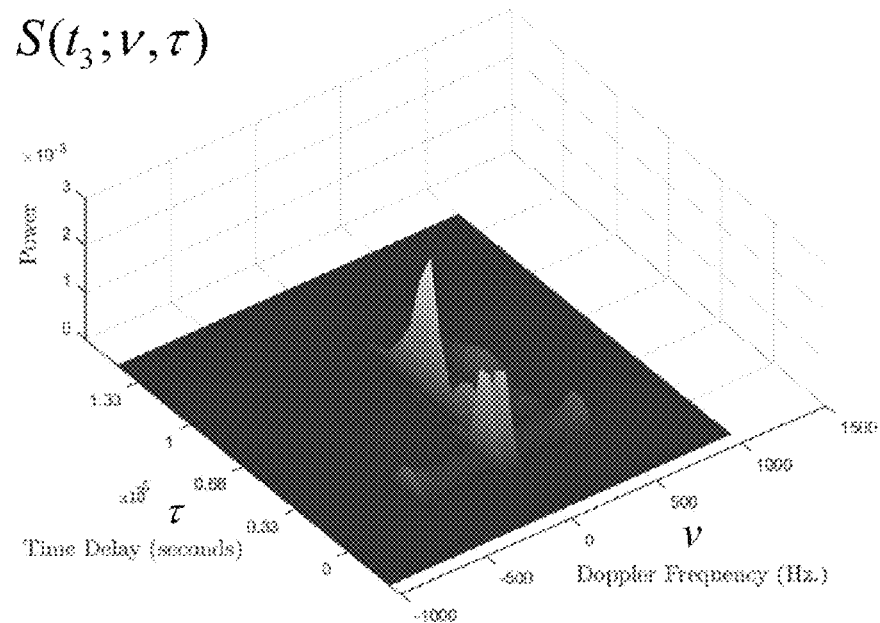
Figure 21D:
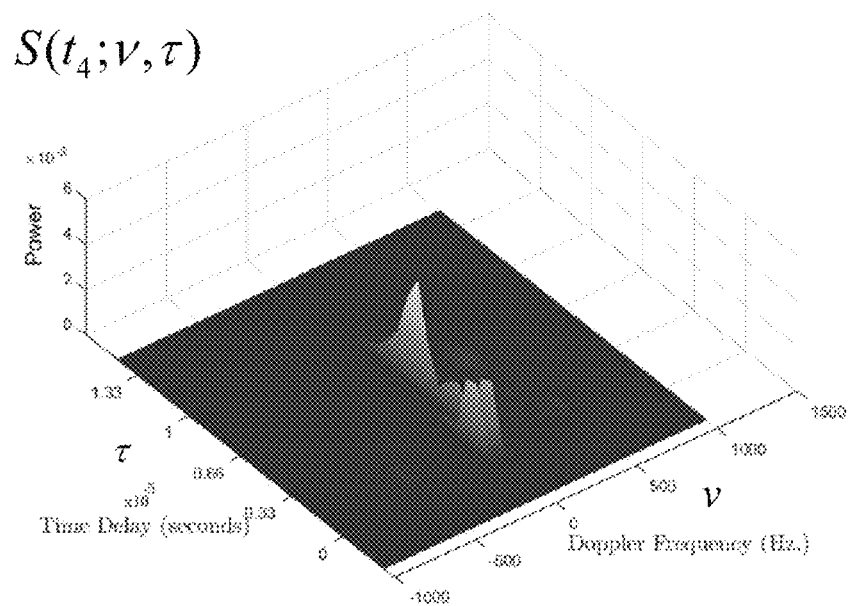
Figure 21E:
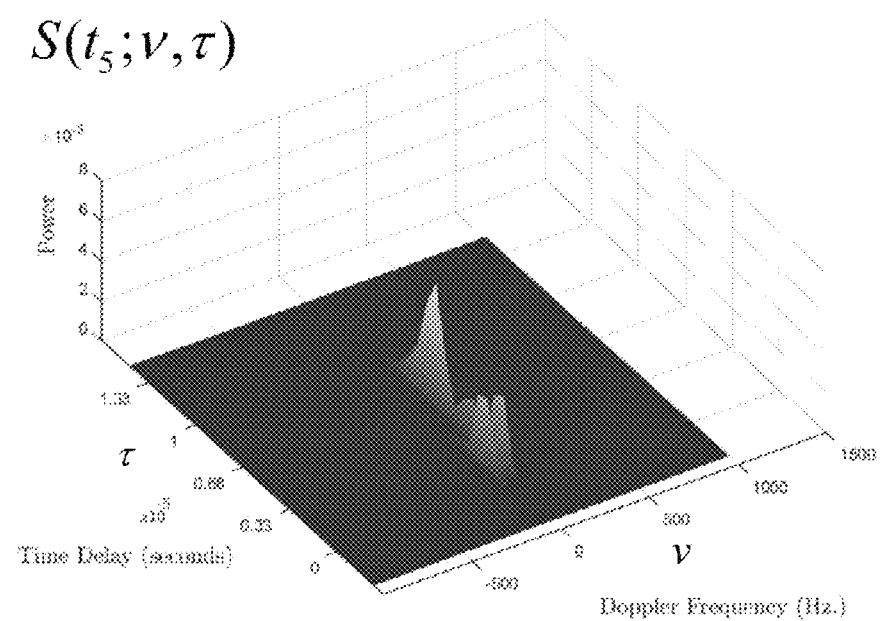

FIG. 20b shows an example of the first 5 basis functions $\dot{\varphi}_\kappa(t)$, obtained from the eigen-decomposition of the modified matrix of correlation matrices, $\dot{\mathcal{R}}_{\varsigma\,\kappa}(t,s)$. This modification is based on the windowing of $\mathcal{R}_{\varsigma\,\kappa}(t,s)$ by the filter or bidimensional window w(t,s) for each of the correlation matrices in 0<t<T, 0<s<T.

FIG. 21a, FIG. 21b, FIG. 21c, FIG. 21d and FIG. 21e show the statistical performance obtained by the generic doubly selective channel emulator, locally non-stationary in time, non-stationary in frequency, and with non-separable scattering function. of the present invention, where the evolution of the COST-BU scattering function with a Doppler frequency [−500 Hz, 500 Hz] to a Doppler dispersion of [−50 Hz, 50 Hz], whose functions were shown in FIG. 18.

Method for Generic Emulation/Simulation of Doubly Selective Channels, Locally Non-Stationary in Time, Non-Stationary in Frequency, and with Non-Separable Dispersion Function.

1.—To perform the generic emulation of doubly selective channels, locally non-stationary in time, non-stationary in frequency, and with non-separable scattering function, it is important to define the correlation tensor $R_{h_{bb}}(t,s; \tau,\xi)$, a which can be obtained from the channel dispersion function specified by means of communication standards, field measurements or by the user. In this way, the maximum Doppler frequency is defined $f_{Dmax}$ and maximum delay $\tau_{max}$, as well as the universal delay profile. In addition, it is necessary to define the time T of duration in which the correlation tensor is defined $R_{h_{bb}}(t,s; \tau, \xi)$ and the mean square error corresponding to the approximation of the doubly dispersive channel.

2.—Having defined the correlation tensor $R_{h_{bb}}(t,s; \tau, \xi)$ and thus, after having obtained the correlation tensor with reduced dimensionality $R_{\varsigma_\kappa}(t, s)$, it continue to make a rearrangement of the tensor $R_{\varsigma_\kappa}(t, s)$ as a matrix of correlation matrices $\mathcal{R}_{\varsigma_\kappa}(t, s)$ with the objective of observing the correlation of the non-physical or virtual delay domain given by the coordinate index $(\varsigma, \kappa)$ and also the corresponding time correlation matrix observed in the interval $0<t<T$ y $0<s<T$, as shown in FIG. 6 and FIG. 7.

3.—Once the matrix of correlation matrices $\mathcal{R}_{\varsigma_\kappa}(t,s)$ has been obtained, the eigen-decomposition of it is performed as described in the equations (XIX) and (XX), for obtaining a set of eigenfunctions $\varphi_\kappa(t)$ with its corresponding eigenvalues $\Lambda_\kappa$[REF5]. The size of the matrix of matrices $\mathcal{R}_{\varsigma_\kappa}(t,s)$ and therefore the set of basis functions $\varphi_\kappa(t)$ and eigenvalues $\Lambda_\kappa$, will be determined by the number $L_{min}$ of universal functions required by the expansion in (XI), as a result of the MSE approximation error of the channel orthogonalization.

$$\Lambda_k \varphi_k(s) = \int_0^{T_{Lmin}} \mathcal{R}_{\varsigma,\kappa}(t, s)\varphi_k(t)dt. \qquad (XIX)$$

$$\xi(t) = \sum_{k=1}^{K_{min}} P_k \varphi_k(t), \; 0 < t < T_{Lmin} \qquad (XX)$$

As a result of the eigen-decomposition of the matrix of matrices $\mathcal{R}_{\varsigma_\kappa}(t,s)$, the eigenfunctions $\varphi_\kappa(t)$ are obtained, defined in the interval $0<t<T_{Lmin}$ where $T_{Lmin}=T*L_{min}$, in conjunction with their eigenvalues $\Lambda_\kappa$ for $k=1, 2, \ldots, K_{min}$; where $K_{min}$ is the number of eigenfunctions and eigenvalues required to expand a process $\xi(t)$ with a predefined MSE approximation error to the matrix of correlation matrices $\mathcal{R}_{\varsigma_\kappa}(t,s)$.

4.—A generation of $K_{min}$ complex Gaussian random variables $\rho_\kappa$ of unit variance is performed, whose are weighted by its corresponding eigenvalue $\Lambda_\kappa$. Specifically, we obtain a set of random variables $P_\kappa = \sqrt{\Lambda_\kappa} * \rho_\kappa$ that applying them to eigen-functions $\varphi_\kappa(t)$, will expand the process $\xi(t)$ defined in the interval $0<t<T_{Lmin}$. The process (t) represents $L_{min}$ realizations $\varsigma_\varsigma(t)$ where each of the realizations $\varsigma=1, 2, \ldots, L_{min}$ is defined in the interval $0<t<T$, as shown in FIG. 8 and FIG. 9.

5.—After having generated a realization of the process $\xi(t)$, we proceed to rearrange it in $L_{min}$ independent sequences $\varsigma_{\varsigma_l}(t)$ from the reassignment according to the number of the process $\varsigma=1, 2, \ldots, L_{min}$ as shown in FIG. 10. In this way, channel realizations are generated for each time $l=1, 2, \ldots, \infty$ and the concatenation of realizations are continued $\varsigma_{\varsigma_l}(t)$ as shown in the same FIG. 10.

6.—Likewise, another process similar to $\xi(t)$ and another set of realizations called $\chi_{\varsigma_l}(t)$ are produced; then a window $w(t)$ is used to weight each realization of each generated sequences $\varsigma_{\varsigma_l}(t)$ and $\chi_{\varsigma_l}(t)$ for $\varsigma=1, 2, \ldots, L_{min}$, y $l=1, 2, \ldots, \infty$.

7.—Subsequently, the sequences $\varsigma_{\varsigma_l}(t)$ and $\chi_{\varsigma_l}(t)$ once weighted are shifted by a realization of a uniform random variable $\alpha$ whose value will remain constant for $l=1, 2, \ldots, \infty$, as described below:

$$l*T - \frac{T}{2} \le t < l*T + \frac{T}{2}, l=1, 2, \ldots, \infty, \qquad (XXI)$$

and where $\chi_{l,\varsigma}(t)$ will have also an additional phase shift of $T/2$; hence it will be obtained $L_{min}$ sums of sequences according to the index of the generated process $\varsigma=1, 2, \ldots, L_{min}$ as described in FIG. 11 for $\varsigma=1$. Therefore, it has been generated $L_{min}$ correlated and arbitrarily long stochastic processes $\beta_\varsigma(t)$, with stationary or non-stationary statistics that have been predefined in the correlation matrix. Note that the different $L_{min}$ stochastic processes $\beta_\varsigma(t)$ have a phase shift determined by a random value defined by the parameter $\alpha$ whose value remains constant throughout the life of the processes $\beta_\varsigma(t)$. The single schema of concatenation of windowed processes, for realization of random processes, is explained in detail in the patent "Método y aparato de generación de realizaciones de canal estacionarias y no-estacionarias de longitud arbitraria".

It is important to note that the number of eigenfunctions $\varphi_\kappa(t)$ can be reduced in conjunction with the corresponding eigenvalues $\Lambda_\kappa$ for $k=1, 2, \ldots, K_{min}$, required to expand a process $\xi(t)$; it can be also avoided the operation of multiplying the window $w(t)$ to each of the realizations of each of the generated sequences $\varsigma_{\varsigma_l}(t)$ and $\chi_{\varsigma_l}(t)$ for $\varsigma=1, 2, \ldots, L_{min}$, and $l=1, 2, \ldots, \infty$. The aforementioned is achieved by using the following stochastic process generation methodology:

a) It is defined the correlation matrix corresponding to the process to be generated, which in this case would be the corresponding index correlation matrix $\langle \varsigma, \kappa \rangle$ of the matrix of correlation matrices $\mathcal{R}_{\varsigma_\kappa}(t,s)$.

b) It is defined a filter or two-dimensional window $F_{BF}(t,s)$ which in this case will be the window $w(t, s)=w(t)w(s)$ shown in FIG. 12.

c) The Hadamard product of the two-dimensional window $F_{BF}(t,s)$ and each of the temporal correlation matrices $\varsigma=1, 2, \ldots, Lmin$ and $\kappa=1, 2, \ldots, Lmin$ that conforms $\mathcal{R}_{\varsigma_\kappa}(t,s)$, and thus a modified correlation function $\dot{\mathcal{R}}_{\varsigma_\kappa}(t,s)$ is generated, as shown in FIG. 13. The above can be represented by the following definition:

$$\dot{\mathcal{R}}_{\varsigma_\kappa}(t,s) = \mathcal{R}_{\varsigma_\kappa}(t,s) \odot w(t,s) \; 0<t<T, 0<s<T, \qquad (XXII)$$

where the operator $\odot$ defines the Hadamard product.

d) The Karhunen-Loève expansion of the modified correlation matrix $\dot{\mathcal{R}}_{\varsigma_\kappa}(t,s)$ is performed, generating the corresponding eigenvalues and eigenvectors $[\dot{\Lambda}_\kappa, \dot{\varphi}_\kappa(t)]$. In the case of the expansion of processes $\xi(t)$ corresponding to the matrix of correlation matrices $\dot{\mathcal{R}}_{\varsigma_\kappa}(t,s)$, the eigen-decomposition is performed to the matrix of correlation matrices $\dot{\mathcal{R}}_{\varsigma_x}(t,s)$ completely. With this procedure, a new set of eigenfunctions $\dot{\varphi}_\kappa(t)$ with its corresponding eigenvalues $\dot{\Lambda}_\kappa$ are generated, which are able to expand processes $\xi(t)$ where the windowing has already been implicitly applied by the equation (XXII).

e) Later, $K_{min}$ complex Gaussian random variables $\rho_\kappa$ of unit variance are generated to be weighed with its corresponding eigenvalue $\dot{\Lambda}_\kappa$, thus obtaining the coefficients $P_\kappa = \sqrt{\dot{\Lambda}_\kappa} * \rho_\kappa$.

f) The expansion of the stochastic process is carried out $\xi(t)$ as expressed in (XX) and shown in FIG. 9.

g) Likewise, another process similar to ξ(t) and therefore another set of realizations called $\mathcal{X}_{\varsigma\_i}(t)$, which do not require a weighting by the window w(t).

h) The sequences $\zeta_{\varsigma\_i}(t)$ and $\mathcal{X}_{\varsigma\_i}(t)$ are phase shifted by a realization of the random variable α, while $\mathcal{X}_{\varsigma\_i}(t)$ will also have an additional phase shift of T/2. As a result, $L_{min}$ sum of sequences are carried out, according to the index of the process generated $\varsigma = 1, 2, \ldots, L_{min}$. In this way, $L_{min}$ arbitrarily long stochastic processes $\beta_\varsigma(t)$ are generated, with predefined statistics capable of being stationary or non-stationary, as shown in FIG. 11. This schema of concatenation of windowed processes, where the characteristics required by the window w (t) and the parameter α, is found in the patent "Método y aparato de generación de realizaciones de canal estacionarias y no-estacionarias de longitud arbitraria".

8.—Once the $L_{min}$ arbitrarily long stochastic processes $\beta_\varsigma(t)$ are generated, by means of any of the two variants explained previously, it follows to perform the expansion of the channel realization $\hat{h}_{bb}(t; \tau)$ from the multiplication of the processes $\beta_\varsigma(t)$, with the set of universal orthogonal functions $\psi_\varsigma(\tau)$, as described as follows:

$$\hat{h}_{bb}(t; \tau) = \sum_{\varsigma=1}^{L_{min}} \beta_\varsigma(t)\psi_\varsigma(\tau), \qquad \text{(XXIII)}$$

9.—Finally, from the discretization of the realization of the channel $\hat{h}_{bb}(t; \tau)$ that is sampled every $T_s$ seconds, it is obtained the processes $h_q[nT_s]$ for q=0, 1, 2, ..., Q−1, that represent the discrete channel as a linear filter of Q taps, variant in time, and that will impregnate (through the convolution process) the distortions to the signal of interest $u(t=nT_s)$ according to the statistics defined in the design of the emulator's realizations, which may be generated according to a doubly selective non-stationary propagation environment with Non-separable Dispersion.

Implementation of the Proposed Channel Model.

FIG. 14 shows the general architecture of the proposed emulator for doubly-selective channels 1400 able to emulate the statistics of a non-separable dispersion function and the locally non-stationarity of the channel, supported by expressions (X) to (XVIII) and whose generation method previously presented is based on the analysis and synthesis expressions defined in (XIX) and (XX), respectively, as well as the rearrangement of the channel realizations, as explained before.

The proposed architecture consists of six essential blocks 1401-1406, which in conjunction serve to generate a non-stationary stochastic process with statistics that can evolve over time and that represent doubly dispersive channels; i.e., dispersive in Doppler frequency and time delay, with non-separable dispersion function. The channel emulation scheme given by the system 1400 allows to impregnate doubly selective distortions to an input signal u(t) coming from the output of a baseband transmitter device, resulting in a signal y(t) properly distorted with the statistics of a previously defined channel.

The general architecture 1400 described in FIG. 14 contains a finite state machine 1401 CNTL_1 which performs the general control of the architecture. Which through a group of essential signals like "Data_conf_system", "Instruction", "Start", "Rst" y "Clk", perform the initialization processes of required parameters along the blocks of the general architecture 1400, as well as determines the processing of the data for the correct generation of stochastic processes $\beta_\varsigma(t)$ where $\varsigma$ is defined in the way $\varsigma = 1, 2, \ldots, L_{min}$, and thus to carry out the expansion of the realization of the channel $\hat{h}_{bb}(t;\tau)$ that will be applied to the signal of interest u(t).

The block 1402 GEN_EIGEN_VALFUNC_1 shown in FIG. 14, performs the generation of the coefficients $P_\kappa$ from random Gaussian variables $\rho_\kappa$ of unit variance, and whose variance of $P_\kappa$, is determined according to the eigenvalues $\Lambda_\kappa$ previously stored. It also stores and produces the values of the eigenfunctions $\varphi_\kappa(t)$, to be delivered to the module 1403 GEN_EXPANSION_MEM_1.

Likewise, the block 1402 GEN_EIGEN_VALFUNC_1 is formed by two submodules, which are shown in FIG. 15. The first submodule 15001 GEN_EIGENVAL_1 contains a Gaussian random variable generator GRNG that produces $K_{min}$ random variables $\rho_\kappa$ to be weighted by the eigenvalues $\Lambda_\kappa$ previously stored in a memory MEM_EVAL_1. The second submodule 15002 MEM_EIGEN_FUNC_1 consists of a block of memory, which stores the sets of eigenfunctions $\varphi_\kappa(t)$ that, similar to the eigenvalues $\Lambda_\kappa$, were obtained from the process of eigen-decomposition of the matrix of matrices $\mathcal{R}_{\varsigma,\kappa}(t,s)$.

The module 1403 GEN_EXPANSION_MEM_1 performs the process expansion ξ(t) periodically, from the parameters $\Lambda_\kappa$ and $\varphi_\kappa(t)$, and subsequently generates two sets of $L_{min}$ channel realizations $\zeta_\varsigma(t)$ and $\mathcal{X}_\varsigma(t)$, of duration T, with predefined statistics from the rearrangement of the process ξ(t) according to the process index $\varsigma = 1, 2, \ldots, L_{min}$.

Likewise, the block 1403 GEN_EXPANSION_MEM_1 is formed by three main submodules, which are shown in FIG. 16. The submodule 16001 MULT_ADD_1 receives the values of the previously weighted random variables $P_\kappa$ and multiplies them with the eigenfunctions $\varphi_\kappa(t)$ to carry out the expansion of the processes ξ(t) as defined in (XX). Subsequently, the submodule 16002 REAC_ASIFNPROC_1 performs the rearrangement/assignment of two processes of the type ξ(t) to two sequences $\zeta_\varsigma(t)$ and $\mathcal{X}_\varsigma(t)$ as indicated by the process index $\varsigma = 1, 2, \ldots, L_{min}$. Besides, the set of $L_{min}$ submodules 16003 DMEM_1, DMEM_2, ..., DMEM_K-min are buffer-like memory blocks that store the sequences $\zeta_\varsigma(t)$ and $\mathcal{X}_\varsigma(t)$ as indicated by the process index $\varsigma = 1, 2, \ldots, L_{min}$, and which will deliver the values of the sequences $\zeta_\varsigma(t)$ and $\mathcal{X}_\varsigma(t)$ for further processing.

The module 1404 VENT_SUMPROC_1 is the block responsible for generating $L_{min}$ arbitrarily long stochastic processes with non-stationary statistics $\beta_\varsigma(t)$. Each of the processes $\beta_\varsigma(t)$ are generated from the sum of two sequences $\zeta_\varsigma(t)$ and $\mathcal{X}_\varsigma(t)$. Previously, the window is applied to each of the sequences $\zeta_\varsigma(t)$ and $\mathcal{X}_\varsigma(t)$ each period T, and later, a delay α is applied to both sequences whose value is random at the beginning of the emulation process and subsequently remains constant. In addition, one of the sequences is delayed with respect to the other T/2 and then both added for yielding the process $\beta_\varsigma(t)$. It is important to highlight that the generation of stochastic processes $\beta_\varsigma(t)$ for $\varsigma = 1, 2, \ldots, L_{min}$, are of arbitrary length, and that it is employed the window scheme and parameter considerations of α, and the window w (t) presented in the patent "Método y aparato de generación de realizaciones de canal estacionarias y no-estacionarias de longitud arbitraria".

Likewise, the module 1404 VENT_SUMPROC_1 is formed by four main blocks which are shown in FIG. 17. The module 1404 VENT_SUMPROC_1 has $L_{min}$ process generators 17001 MULT_W1_SUM, MULT_W2_SUM to MULT_WLmin_SUM which are responsible of making a sum of the sequences $\zeta_\varsigma(t)$ and $\chi_\varsigma(t)$ specifically to obtain the processes $\beta_\varsigma(t)$ arbitrarily long for $\varsigma=1, 2, \ldots, L_{min}$. Each of the generators contains two submodules, the submodule 17002 DELAY is responsible for generating a time shift from a previously configured value, for the case of the branch of the sequence $\zeta_\varsigma(t)$ the delay is set from the value $\alpha-T/2$, where $\alpha$ and T are parameters previously calculated. Besides, submodule 17003 is a memory block; its registers are initialized with the values of the window function which, like $\alpha$ and T, are defined as previously presented in the patent "Método y aparato de generación de realizaciones de canal estacionarias y no-estacionarias de longitud arbitraria".

However, it is important to highlight that in case of generating the processes $\xi(t)$ by means of the stochastic process generation methodology presented in this patent (where the matrix of correlation matrices is modified $\mathcal{R}_\varsigma(t,s)$ with a two-dimensional filter), the memory block indicated as the submodule 17003 will be initialized by a constant function, which will not modify in amplitude the previously generated sequences $\zeta_\varsigma(t)$ and $\chi_\varsigma(t)$, because these sequences already have this window implicity.

The block 1405 MULT_FUNC_UNIVERSAL_1 shown in FIG. 14, performs vector multiplication of the arbitrarily long stochastic processes $\beta_\varsigma(t)$ with the universal base functions $\psi_\varsigma(t)$ to expand the generated cannel $\hat{h}_{bb}(t;\tau)$. Likewise, an interpolation scheme is used so that the expansion of the channel generated in (XXIII) matches the sampling rate at which the input signal u(t), coming from the output of a transmitting device, is delivered. In this way the resulting processes $h_q[nT_s]$ for $q=0, 1, 2, \ldots, Q-1$, are correlated stochastic processes that are generated at the required sampling rates.

The module 1406 OPCONVCHNL_1 presented in FIG. 14, performs the convolution operation between the input signal u(t) and $h_q[nT_s]$ for $q=0, 1, 2, \ldots, Q 1$, at the sampling rate defined by $T_s$ and which are generated by the module 1405 MULT_FUNC_UNIVERSAL_1 from the statistics of the predefined scattering function $S(v, \tau)$, which can evolve over time if desired as for $S(t; v, \tau)$. Hence, the obtained signal y(t) has been properly distorted with the statistics of a previously defined non-stationary channel with a non-separable dispersion function.

Statistical results of the generated channel realizations of a non-separable dispersion function, obtained by applying the method and apparatus proposed in the present invention.

In order to demonstrate the accuracy and quality of the channel realizations generated by the method and apparatus proposed in the present invention, two non-separable dispersion functions obtained by different parameterization of the channel defined by the COST-BU standard are used as an example, whose are shown in FIG. 18a and FIG. 18b. The results presented below are obtained through the concatenation of stochastic processes which are generated from two sets of eigenfunctions $\varphi_\kappa(t)$ and eigenvalues $\Lambda_\kappa$. The two sets of eigenfunctions and eigenvalues were obtained from the two NSSF indicated in FIG. 18a and FIG. 18b. The simulation starts with the generation of channel realizations from the dispersion function COST-BU 1 with the Doppler bandwidth parameters specified as [−500 Hz, 500 Hz], a maximum delay value $\tau_{max}=10e-6$ seconds; and subsequently the channel realizations evolve into a COST-BU 2 dispersion function with Doppler bandwidth parameters of [−50 Hz, 50 Hz] and a maximum delay value $\tau_{max}=7e-6$ seconds, as shown in FIG. 19. The sampling frequency is $F_s=1.35$ Mhz and the band limiting filter is represented by a raised cosine function with a total bandwidth of 675 kHz and an excess bandwidth of 0.5. In the case of the universal orthogonal functions, it is considered $L_{min}=7$ functions for the given channel parameters.

In FIGS. 20a and 20b are plotted for comparison purposes, the basis functions $\varphi_\kappa(t)$ obtained from the eigen-decomposition of the matrix of matrices $\mathcal{R}_{\varsigma\,\kappa}(t,s)$, and the basis functions $\dot{\varphi}_\kappa(t)$ obtained from the eigen-decomposition of the matrix of matrices $\dot{\mathcal{R}}_{\varsigma\,\kappa}(t,s)$, respectively; where the latter implicitly includes the two-dimensional window w(t,s), as it was applied before the eigen-decomposition was carried out.

FIG. 21a, FIG. 21b, FIG. 21c, FIG. 21d and FIG. 21e show the evolution of the dispersion function $S(t; v, \tau)$ in 5 instants of time $t_1$, $t_2$, $t_3$, $t_4$ and $t_5$; with changes form a dispersion in Doppler frequency of [−500 Hz, 500 Hz] into a dispersion of [−50 Hz, 50 Hz]. The resulting time-variant dispersion function in the time $S(t,v,\tau)$, was obtained from 10,000 realizations made from the generation of $L_{min}=7$ stochastic processes $\beta_\varsigma(t)$.

The present invention has been described in its preferred embodiment, however, it will be apparent to those skilled in the art, that a multiplicity of changes and modifications of this invention can be made, without departing from the scope of the following claims. The descriptions of the methods and process diagrams presented in the present invention are provided simply as illustrative examples and are not intended to require or imply that the steps of the various definitions must be performed in the order presented. As will be appreciated by one skilled in the art, the steps of the various previous definitions can be performed in any order. Words such as "then", "next", etc., are not intended to limit the order of steps; these words are used simply to guide the reader through the description of the methods. Although process diagrams can describe operations as a sequential process, many of the operations can be performed in parallel or simultaneously. In addition, the order of operations may change. A process can correspond to a method, a function, a procedure, a subroutine, a sub-program, etc. When a process corresponds to a function, its termination may correspond to a return of the function, to the call function or the main function.

The various blocks, modules, circuits and steps of the illustrated logic algorithm blocks, described in connection with the definitions described in the present document may be implemented as electronic hardware, computer software, or combinations of both. To clearly illustrate this interchangeability of hardware and software, various commented components, blocks, modules, circuits and steps have been described above generally in terms of their functionality. Whether such functionality is implemented as hardware or software depends on the limitations of the application and/or the particular design imposed by a system in general. The experts can implement the described functionality in various ways for each particular application, but such implementation decisions should not be interpreted as causing a departure from the scope of the present invention.

Embodiments implemented in computer programs can be implemented in software, firmware, middleware, microcode, hardware description languages, or any combination thereof. A segment of code or instructions executable by machine can represent a procedure, a function, a program, a routine, a subroutine, a module, a software package, a class, or any combination of instructions, data structures, or program instructions. A code segment may be implemented or described in another code segment, or a hardware circuit, passing and/or receiving information, data, arguments, parameters or memory content. Information, arguments, parameters, data, etc., can be passed, forwarded or transmitted through any suitable means, including the exchange of memory, sending of messages, sending through tokens, transmission of the network, etc.

When implemented in software, functions can be stored as one or more instructions, or code in a computer-readable storage medium either transiently or as a final destination. The steps of a method or algorithm described in this document can be included in a software module executable in a processor, which can reside in a storage medium readable by computer or readable by a processor module. The non-transient communication means readable by computer or readable by the processor, include both computer storage means and storage media of materials that facilitate the transfer of a computer program from one place to another. A non-transient storage medium readable by the processor can be any available means that can be accessed by a computer. By way of example, and not limitation, such non-transient means readable by the processor, may comprise RAM, ROM, EEPROM, CD-ROM or other optical disk storage, magnetic disk storage or other magnetic storage devices, or any another means of tangible storage that can be used to store desired program code in the form of instructions or data structures and which can be accessed by a computer or processor. Disk, as used in this document, includes compact disc (CD), laser discs, optical discs, digital versatile discs (DVD), a floppy disk and the Blu-ray disc on discs are usually reproduced magnetically, while the discs reproduce data optically with lasers. Combinations of the above should also be included within the scope of computer readable media. In addition, the operations of a procedure or algorithm may reside as one or any combination or set of codes and/or instructions in a non-transient medium readable for a processor, and/or in a non-transient medium readable for a computer, which it can be incorporated into a software product.

When implemented in hardware, the functionality can be implemented within a signal processing circuit, which may be suitable for use in a wireless receiver or mobile device. Such implementation of signal processing may include circuits to obtain the measurement of the signal of interest, as well as calculation steps described in the definitions presented in the present invention.

The hardware used to implement logical functions, logic blocks, modules and circuits described in connection with the aspects described in this document, can be implemented or implemented with a general-purpose processor, a digital signal processor (DSP), a specific application integrated circuit (ASIC), an array of programmable field gates (FPGA) or other programmable logic device, discrete gate or transistor logic, discrete hardware components, or any combination of them designed to perform the functions described in this document. A general-purpose processor may be a microprocessor, but, in the alternative, the processor may be any conventional processor, controller, microcontroller, or state machine. A processor can also be implemented as a combination of computing devices, for example, a combination of a DSP and a microprocessor, a plurality of microprocessors, one or more microprocessors together with a DSP core, or any other configuration. Alternatively, some steps or methods can be performed by circuits that are specific to a given function.

Any reference to the claim elements in the singular, for example, using the articles "a", "an" or "the" should not be interpreted as limiting the element to the singular. The above description of the disclosed definitions is provided to enable any person skilled in the art to make or use the present invention. Various modifications to these definitions and/or implementations will be readily apparent to those skilled in the art, and the generic principles defined herein may be applied to other embodiments without departing from the spirit or scope of the invention. Thus, the present invention is not intended to be limited to the embodiments shown in this document, but should be accorded the broadest scope consistent with the following claims and the novel principles and features described herein.

REFERENCES

[REF1] Parsons, J. (1992). *The mobile radio propagation channel*. Halsted Press.

[REF2] P. Bello, "Characterization of randomly time-variant linear channels," vol. 11, no. 4, pp. 360 393, December 1963.

[REF3] Lee, W. (1995). "Mobile Cellular Telecommunications: Analog and Digital Systems". McGraw-Hill.

[REF4] Parra-Michel, R. (2003). "Modelado y Simulación de Canales de Banda Amplia. PhD thesis. Channel," IEEE Transactions on Vehicular Technology, vol. 41, no. 4, pp. 461-468, November 1992.

[REF5] K.-W. Yip and T.-S. Ng, "Karhunen-Loève expansion of the wssus channel output and its application to efficient simulation," Selected Areas in Communications, IEEE Journal on, vol. 15, no. 4, pp. 640-646, May 1997.

[REF6] R. Parra-Michel, V. Kontorovitch, and A. Orozco-Lugo, "Simulation of wideband channels with non-separable scattering functions," in Proc. IEEE International Conference on Acoustics, Speech, and Signal Processing (ICASSP '02), vol. 3,13-17 May 2002, pp. 2829-2832.

The invention claimed is:

1. A method for testing wireless communication signal processing equipment comprising generating a signal that simulates a doubly selective channel, wherein said simulated signal is locally non-stationary in time, non-stationary in frequency, and with a non-separable dispersion function implemented by means of a signal processor comprising the steps of:
 a) defining one or a plurality of dispersion functions, $S(v,\tau)$ inherent to a channel $c_{bb}(t;\tau)$,
 b) determining one or a plurality of a limiting band filter $g(\tau)$ according to a maximum bandwidth of signals to be transmitted,
 c) obtaining said channel limited in band by convolving said channel with said limiting band filter according to the following equation:

$$h_{bb}(t;\tau) = c_{bb}(t;\tau) * g(\tau),$$

d) obtaining one or a plurality of universal correlation functions $R_U(\tau,\xi)$ by:
  i. defining a maximum delay time $\tau_{max}$,
  ii. generating one or a plurality of two-dimensional profile that complies with a principle of expansion of subspaces of correlation functions limited in time delay,
  iii. generating a universal correlation function through $$R_U(\tau, \xi) = \int_{-\infty}^{\infty}\int_{-\infty}^{\infty} P_U(\tau, \xi) g(\tau) g(\xi) dt d\xi$$

e) wherein a set of basis functions and their corresponding weights of correlation function $R_U(\tau,\xi)$ are obtained from a matrix factorization technique, f) determining a certain threshold of permissible error in an approximation, which is given by a relative power of eigenvalues, choose $\varsigma=1, 2, \ldots, L_{min}$ universal eigen functions, $\psi_\varsigma(\tau)$, and universal eigenvalues, $\lambda_\varsigma$, which can represent processes with an error less than or equal to that established in said threshold, g) defining one or a plurality of correlation tensors $R_{h_{bb}}(t,s; \tau,\xi)$, determined from one technique selected from measurements, user-defined functions or communication standards, considering a particular shaping filter, h) creating one or a plurality of orthogonalization processes in a time delay domain with universal functions to obtain tensor $R_{\varsigma,\kappa}(t,s)$ from $R_{\varsigma,\kappa}(t,s) = \int_{-\infty}^{\infty}\int_{-\infty}^{\infty} R_{h_{bb}}(t, s; \tau,\xi) \psi_\varsigma(\tau)\psi_\kappa(\xi) d\tau d\xi$, where basis functions $\psi_\varsigma(\tau)$ are obtained from eigen-decomposition of said universal correlation function, i) creating a rearrangement of said tensor $\mathcal{R}_{\varsigma,\kappa}(t,s)$ as a matrix of correlation matrices or functions $\mathcal{R}_{\varsigma,\kappa}(t,s)$, j) obtaining one or a plurality of a set of functions and their corresponding weights of matrix of matrices $\mathcal{R}_{\varsigma,\kappa}(t,s)$ from a matrix factorization technique that allows to expand said matrix of matrices $\mathcal{R}_{\varsigma,\kappa}(t,s)$, k) generating a set of parameters from a set of functions and weights obtained according to said matrix factorization method l) performing one or a plurality of stochastic process expansion $\xi(t)$ from a set of functions and their corresponding weights of said matrix of matrices $\mathcal{R}_{\varsigma,\kappa}(t,s)$ based on a matrix factorization technique and wherein an expansion of the stochastic process $\xi(t)$ is implemented as expressed below $$\xi(t) = \sum_{k=1}^{K_{min}} P_k \varphi_k(t), 0 < t < T_{Lmin},$$

m) rearranging the process $\xi(t)$ in $L_{min}$ independent sequences $\varsigma_{cl}(t)$ from a reassignment of each T seconds as correspond to process number $\varsigma=1, 2, \ldots, L_{min}$, n) generating another, or another plurality of a process of the type $\xi(t)$ according to the subsection l), which is also rearranged as was done in the subsection m), to result in one or a plurality of processes $\varsigma_{cl}(t)$ and $\chi_{\varsigma,l}(t)$ for $\varsigma=1, 2, \ldots, L_{min}$, y $l=1, 2, \ldots, \infty$, o)

p) expanding the realization of the channel $\hat{h}_{bb}(t; \tau)$ with the set of functions defined according to the factorization technique explained in subsection e) above, q) sampling $\hat{h}_{bb}(t; \tau)$ by a required sampling period $T_s$; thereby obtaining a discrete and time-varying linear filter wherein each tap is a discrete process correlated with others, $h_q[nT_s]$ for $q=0, 1, 2, \ldots, Q-1$, and r) convoluting a discrete channel with a signal of interest $u(t=nT_s)$ for obtaining an output signal $y(t=nT_s)$, where one or a plurality of filters required that is used to distort said signal of interest $u(t=nT_s)$, and thus provoke changes that would have been obtained if it were transmitted through a real channel, whose statistics are used in an emulator, and s) detecting said signal with a signal processing device.

2. The method according to claim 1 wherein any set of orthogonal functions $\psi_\varsigma(\tau)$ are used, that represent a basis for a band-limited channel, and thus generate the processes $\psi_\varsigma(t)$ with statistics $R_{\varsigma,\kappa}(t,s)=E\{\psi_\varsigma(t)\varsigma_\kappa^*(s)\}$.

3. The method according to claim 1 wherein any set of orthogonal functions $\varphi_\kappa(t)$ are used that represent a base and thus generate the processes $\xi(t)$ with statistics $\mathcal{R}_{\varsigma,\kappa}(t,s)$.

4. The method and system, according to claim 1 wherein any set of orthogonal functions $\varphi(t)$ are used and which represent a base and thus generate processes $\xi(t)$ with statistics $\mathcal{R}_{\varsigma,\kappa}(t,s)$.

* * * * *